(12) United States Patent
Eisen

(10) Patent No.: US 9,390,384 B2
(45) Date of Patent: Jul. 12, 2016

(54) SYSTEMS AND METHODS OF SHARING INFORMATION THROUGH A TAGLESS DEVICE CONSORTIUM

(75) Inventor: Ori Eisen, Scottsdale, AZ (US)

(73) Assignee: THE 41ST PARAMETER, INC., Scottsdale, AZ (US)

(*) Notice: Subject to any disclaimer, the term of this patent is extended or adjusted under 35 U.S.C. 154(b) by 1004 days.

(21) Appl. No.: 12/496,572

(22) Filed: Jul. 1, 2009

(65) Prior Publication Data

US 2010/0004965 A1 Jan. 7, 2010

Related U.S. Application Data

(60) Provisional application No. 61/077,475, filed on Jul. 1, 2008.

(51) Int. Cl.
*G06Q 30/02* (2012.01)
*G06Q 10/10* (2012.01)
*H04M 15/00* (2006.01)
*G06Q 10/00* (2012.01)
*G06Q 30/00* (2012.01)
*G06Q 30/06* (2012.01)
*G06Q 40/00* (2012.01)

(52) U.S. Cl.
CPC ............ *G06Q 10/00* (2013.01); *G06Q 30/0185* (2013.01); *G06Q 30/0601* (2013.01); *G06Q 40/12* (2013.12)

(58) Field of Classification Search
CPC .................................................. G06Q 30/0185
USPC ............... 705/1.1, 318, 500; 70/1.1, 318, 500
See application file for complete search history.

(56) References Cited

U.S. PATENT DOCUMENTS

| 5,748,740 | A | 5/1998 | Curry et al. |
| 5,764,275 | A | 6/1998 | Lappington et al. |
| 5,892,900 | A | 4/1999 | Ginter et al. |
| 6,092,053 | A | 7/2000 | Boesch et al. |
| 6,105,012 | A | 8/2000 | Chang et al. |
| 6,112,240 | A | 8/2000 | Pogue et al. |
| 6,148,407 | A | 11/2000 | Aucsmith |
| 6,163,771 | A | 12/2000 | Walker et al. |

(Continued)

FOREIGN PATENT DOCUMENTS

| EP | 0418144 A1 | 3/1991 |
| EP | 0923039 A1 | 6/1999 |

(Continued)

OTHER PUBLICATIONS

U.S. Appl. No. 12/732,034, filed Mar. 25, 2010, Eisen.

(Continued)

*Primary Examiner* — Jonathan Ouellette
(74) *Attorney, Agent, or Firm* — Knobbe, Martens, Olson & Bear, LLP

(57) ABSTRACT

The invention provides one or more consortia of networks that identify and share information about users and/or user devices interacting with the consortia. User devices may be identified, at least in part, by a delta of time parameter between a user device used and a reference time. Other parameters may be analyzed to identify a computer user and/or device and noteworthy transactions. The invention may be used for identity-based applications such as network security, the detection of fraudulent transactions, identity theft, ratings-based communities and law enforcement.

20 Claims, 8 Drawing Sheets

(56) References Cited

U.S. PATENT DOCUMENTS

| | | |
|---|---|---|
| 6,205,436 B1 | 3/2001 | Rosen |
| 6,678,666 B1 | 1/2004 | Boulware |
| 6,718,363 B1 | 4/2004 | Ponte |
| 6,892,307 B1 | 5/2005 | Wood et al. |
| 6,895,507 B1 | 5/2005 | Teppler |
| 6,898,709 B1 | 5/2005 | Teppler |
| 6,908,030 B2 | 6/2005 | Rajasekaran et al. |
| 6,957,339 B2 | 10/2005 | Shinzaki |
| 7,089,585 B1 | 8/2006 | Dharmarajan |
| 7,100,049 B2 | 8/2006 | Gasparini et al. |
| 7,165,051 B2 | 1/2007 | Ronning et al. |
| 7,191,467 B1 | 3/2007 | Dujari et al. |
| 7,260,837 B2 | 8/2007 | Abraham et al. |
| 7,272,728 B2 | 9/2007 | Pierson et al. |
| 7,330,871 B2 | 2/2008 | Barber |
| 7,349,955 B1 | 3/2008 | Korb et al. |
| 7,438,226 B2 | 10/2008 | Helsper et al. |
| 7,577,620 B1 | 8/2009 | Donner |
| 7,853,533 B2 | 12/2010 | Eisen |
| 8,151,327 B2 | 4/2012 | Eisen |
| 8,826,393 B2 | 9/2014 | Eisen |
| 8,862,514 B2 | 10/2014 | Eisen |
| 9,060,012 B2 | 6/2015 | Eisen |
| 9,112,850 B1 | 8/2015 | Eisen |
| 2001/0016876 A1 | 8/2001 | Kurth et al. |
| 2002/0035622 A1 | 3/2002 | Barber |
| 2002/0056042 A1 | 5/2002 | Van Der Kaay et al. |
| 2002/0073046 A1 | 6/2002 | David |
| 2002/0073327 A1 | 6/2002 | Vellandi |
| 2002/0112171 A1 | 8/2002 | Ginter et al. |
| 2002/0153424 A1 | 10/2002 | Li |
| 2002/0156836 A1 | 10/2002 | Janosik, Jr. et al. |
| 2002/0167965 A1 | 11/2002 | Beasley et al. |
| 2003/0033356 A1 | 2/2003 | Tran et al. |
| 2003/0070080 A1 | 4/2003 | Rosen |
| 2003/0076242 A1 | 4/2003 | Burns et al. |
| 2003/0105854 A1 | 6/2003 | Thorsteinsson et al. |
| 2003/0115334 A1 | 6/2003 | Bhat et al. |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0233553 A1 | 12/2003 | Parks et al. |
| 2004/0006553 A1 | 1/2004 | de Vries et al. |
| 2004/0034794 A1 | 2/2004 | Mayer et al. |
| 2004/0105431 A1 | 6/2004 | Monjas-Llorente et al. |
| 2004/0117321 A1 | 6/2004 | Sancho |
| 2004/0166857 A1 | 8/2004 | Shim et al. |
| 2004/0181598 A1 | 9/2004 | Paya et al. |
| 2004/0203750 A1 | 10/2004 | Cowdrey et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2005/0022020 A1 | 1/2005 | Fremberg |
| 2005/0033653 A1 | 2/2005 | Eisenberg et al. |
| 2005/0033703 A1 | 2/2005 | Holdsworth |
| 2005/0076230 A1 | 4/2005 | Redenbaugh et al. |
| 2005/0108177 A1 | 5/2005 | Sancho |
| 2005/0113092 A1 | 5/2005 | Coppinger et al. |
| 2005/0131826 A1 | 6/2005 | Cook |
| 2005/0188423 A1 | 8/2005 | Motsinger et al. |
| 2005/0278542 A1 | 12/2005 | Pierson et al. |
| 2006/0010072 A1 | 1/2006 | Eisen |
| 2006/0048211 A1 | 3/2006 | Pierson et al. |
| 2006/0130132 A1 | 6/2006 | Dharmarajan |
| 2006/0155985 A1 | 7/2006 | Canard et al. |
| 2006/0200855 A1 | 9/2006 | Willis |
| 2006/0200856 A1 | 9/2006 | Salowey et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0287902 A1 | 12/2006 | Helsper et al. |
| 2007/0038568 A1 | 2/2007 | Greene et al. |
| 2007/0043837 A1 | 2/2007 | Kruse et al. |
| 2007/0073630 A1 | 3/2007 | Greene et al. |
| 2007/0204044 A1 | 8/2007 | Rice et al. |
| 2007/0220594 A1* | 9/2007 | Tulsyan ............... 726/5 |
| 2007/0234070 A1 | 10/2007 | Horning et al. |
| 2007/0234409 A1 | 10/2007 | Eisen |
| 2007/0239606 A1 | 10/2007 | Eisen |
| 2007/0294401 A1 | 12/2007 | Shkedi |
| 2008/0010678 A1 | 1/2008 | Burdette et al. |
| 2008/0104672 A1 | 5/2008 | Lunde |
| 2008/0104684 A1 | 5/2008 | Lunde |
| 2008/0133420 A1 | 6/2008 | Barber |
| 2009/0037213 A1 | 2/2009 | Eisen |
| 2009/0083184 A1 | 3/2009 | Eisen |
| 2011/0082768 A1 | 4/2011 | Eisen |
| 2012/0174223 A1 | 7/2012 | Eisen |
| 2015/0221019 A1 | 8/2015 | Eisen |

FOREIGN PATENT DOCUMENTS

| | | |
|---|---|---|
| EP | 1256911 A1 | 11/2002 |
| WO | WO 01/11450 A1 | 2/2001 |
| WO | WO 01/95550 A2 | 12/2001 |
| WO | WO 02/091226 A1 | 11/2002 |
| WO | WO 03/025868 A1 | 3/2003 |
| WO | WO 03/075197 A2 | 9/2003 |
| WO | WO 03/075197 A3 | 12/2003 |
| WO | WO 2004/038997 A1 | 5/2004 |

OTHER PUBLICATIONS

Derfler, et al. How Network Work. Millennium Ed., Que Corporation. Indianapolis. IN. 2000.
European search report and written opinion dated Nov. 15, 2010 for Application No.08165224.0.
Gralla, Preston. How the Internet Works. Millennium Ed., Que Corporation Indianapolis, IN 1999.
International search report dated Oct. 29, 2007 for PCT Application No. US2005/35532.
International search report dated Jul. 3, 2008 for PCT Application No. US2007/65776.
Kohno, et al. Remote Physical Device Fingerprinting. 2005 IEEE Syposium on Security and Privacy (IEEE S&P 2005); May 8-11, 2005; Oakland, California, U.S.A. 16 pages.
Manavoglu, et al. Probabilistic user behavior models. Data Mining. 2003; 203-210.
White, Ron. How Computers Work. Millennium Ed., Que Corporation. Indianapolis, IN. 1999.
European search report dated Dec. 23, 2011 for Application No. 5818903.6.
Office action dated Jan. 6, 2010 for U.S. Appl. No. 11/241,739.
Office action dated Feb. 24, 2009 for U.S. Appl. No. 11/694,882.
Office action dated Mar. 3, 2008 for U.S. Appl. No. 11/241,739.
Office action dated Mar. 4, 2010 for U.S. Appl. No. 12/248,867.
Office action dated Mar. 9, 2009 for U.S. Appl. No. 11/241,739.
Office action dated Mar. 14, 2012 for U.S. Appl. No. 12/892,868.
Office action dated Apr. 16, 2010 for U.S. Appl. No. 11/862,165.
Office action dated Apr. 20, 2012 for U.S. Appl. No. 12/732,034.
Office action dated May 9, 2008 for U.S. Appl. No. 10/791,439.
Office action dated Jun. 1, 2011 for U.S. Appl. No. 11/694,882.
Office action dated Jun. 11, 2008 for U.S. Appl. No. 11/694,882.
Office action dated Jul. 1, 2009 for U.S. Appl. No. 11/241,739.
Office action dated Jul. 7, 2009 for U.S. Appl. No. 11/862,165.
Office action dated Aug. 23, 2010 for U.S. Appl. No. 11/694,882.
Office action dated Sep. 16, 2008 for U.S. Appl. No. 11/241,739.
Office action dated Nov. 15, 2012 for U.S. Appl. No. 12/732,034.
Office action dated Nov. 19, 2012 for U.S. Appl. No. 12/892,868.
Office action dated Nov. 22, 2010 for U.S. Appl. No. 12/248,867.
Office action dated Dec. 7, 2007 for U.S. Appl. No. 10/791,439.
Office action dated Dec. 23, 2009 for U.S. Appl. No. 11/694,882.
Office action dated Mar. 26, 2013 for U.S. Appl. No. 12/248,867.
Office action dated Sep. 10, 2013 for U.S. Appl. No. 13/414,678.
U.S. Appl. No. 14/473,818, filed Aug. 29, 2014, Eisen.
Notice of allowance dated Jan. 3, 2012 for U.S. Appl. No. 11/694,882.
Notice of allowance dated Apr. 30, 2014 for U.S. Appl. No. 13/414,678.

(56) References Cited

OTHER PUBLICATIONS

Notice of allowance dated Jun. 10, 2014 for U.S. Appl. No. 12/248,867.
Notice of allowance dated Jun. 24, 2010 for U.S. Appl. No. 11/241,739.
Office action dated Sep. 19, 2014 for U.S. Appl. No. 12/732,034.
Office action dated Mar. 13, 2014 for U.S. Appl. No. 12/732,034.
Office action dated Mar. 28, 2014 for U.S. Appl. No. 11/862,165.
Notice of allowance dated Dec. 26, 2014 for U.S. Appl. No. 11/862,165.
Notice of allowance dated May 22, 2015 for U.S. Appl. No. 11/862,165.
Notice of allowance dated Jul. 1, 2015 for U.S. Appl. No. 12/732,034.
Notice of allowance dated May 28, 2015 for U.S. Appl. No. 12/732,034.
Office action dated Apr. 8, 2015 for U.S. Appl. No. 12/892,868.
Office action dated Apr. 22, 2015 for U.S. Appl. No. 14/473,818.
Co-pending U.S. Appl. No. 14/826,107, filed Aug. 13, 2015.
Notice of allowance dated Aug. 5, 2015 for U.S. Appl. No. 14/473,818.

* cited by examiner

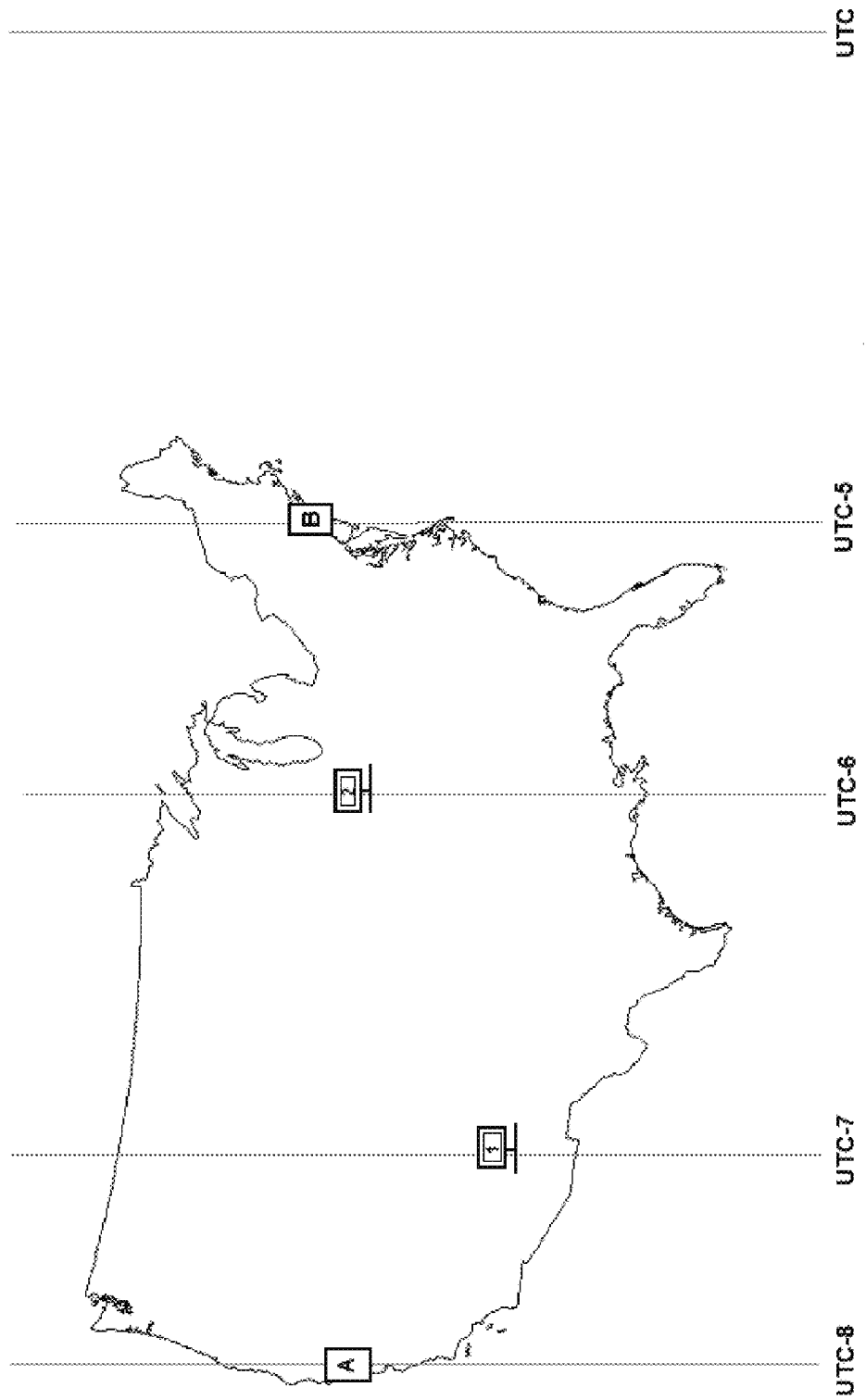

| Server A Local Time | User Computer Local Time | User Computer Information | Delta of Time with respect to Server A Local Time (hrs) | Consortium Time | Server A Local Time with respect to Consortium Time | Delta of Time with respect to Consortium Time (hrs) |
|---|---|---|---|---|---|---|
| 1/1/08 9:00 AM | 1/1/08 10:00 AM | #1: ABCDEF | 1 | 1/1/08 5:00 PM | -8 | -7 |
| 1/1/08 9:05 AM | 1/1/08 11:05 AM | #2: GHIJKL | 2 | 1/1/08 5:05 PM | -8 | -6 |
| Server B Local Time | User Computer Local Time | User Computer Information | Delta of Time with respect to Server B Local Time (hrs) | Consortium Time | Server B Local Time with respect to Consortium Time | Delta of Time with respect to Consortium Time (hrs) |
| 1/1/08 11:00 AM | 1/1/08 9:00 AM | #1: ABCDEF | -2 | 1/1/08 4:00 PM | -5 | -7 |
| 1/1/08 11:05 AM | 1/1/08 10:05 AM | #2: GHIJKL | -1 | 1/1/08 4:05 PM | -5 | -6 |

FIGURE 5B

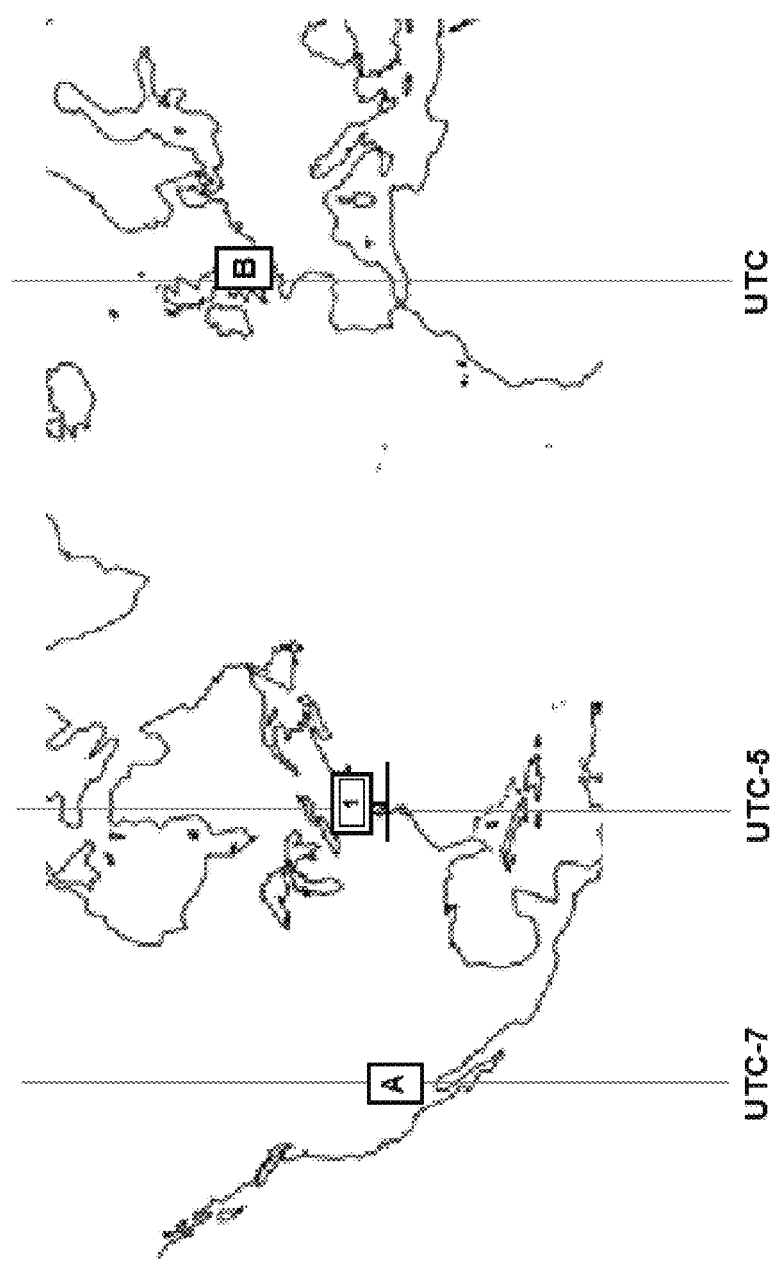

| Server A Local Time | User Computer Local Time | User Computer Information | Delta of Time with respect to Server A Local Time (hrs) | Consortium Time | Server A Local Time with respect to Consortium Time | Delta of Time with respect to Consortium Time (hrs) |
|---|---|---|---|---|---|---|
| 1/1/08 8:00 AM | 1/1/08 10:00 AM | #1: UVWXYZ | 2 | 1/1/08 3:00 PM | -7 | -5 |
| Server B Local Time | User Computer Local Time | User Computer Information | Delta of Time with respect to Server B Local Time (hrs) | Consortium Time | Server B Local Time with respect to Consortium Time | Delta of Time with respect to Consortium Time (hrs) |
| 1/1/08 4:00 PM | 1/1/08 11:00 AM | #1: UVWXYZ | -5 | 1/1/08 4:00 PM | 0 | -5 |

FIGURE 6B

SYSTEMS AND METHODS OF SHARING INFORMATION THROUGH A TAGLESS DEVICE CONSORTIUM

CROSS-REFERENCE

This application claims the benefit of U.S. Provisional Application No. 61/077,475 filed Jul. 1, 2008, which application is incorporated herein by reference in its entirety.

FIELD OF THE INVENTION

The invention relates to network security and the detection of fraudulent transactions and identity theft. More particularly, the invention relates to one or more consortia of computer networks that identify and share information about users and/or computing devices.

BACKGROUND OF THE INVENTION

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user name, address, phone number, and e-mail address will not suffice to detect and determine a probable fraudulent transaction because such information can be altered, manipulated, fraudulently obtained, or simply false.

Furthermore, a fraudulent user may conduct transactions with numerous websites or online businesses. One website merely relying on information gathered during previous transactions with that particular website may limit the scope of fraud prevention potential.

Accordingly, what is needed is a method and system that overcomes the problems associated with a typical verification and fraud prevention system for Internet transactions by identifying each user and/or user device and sharing that information. Then, when a user seeks a second fraudulent transaction, whether the transaction is with the same or different website, the website operator may detect the fraud and take appropriate action.

SUMMARY OF THE INVENTION

The invention provides systems and methods that identify users and/or user devices connecting to a network. Information about a user or user device may be collected during a transaction between a user device and an online host. In some embodiments, a device identifier may be derived from the collected information and assigned to a user device. This information can be used to observe user behavior and activity, such as an account connecting from many different devices, or many accounts connecting from the same device. Such information may help validate devices and the status of the device identifier may be verified as acceptable to the online business based on the status rules of the online business. In addition, this information can be used to cross-reference computing devices used by known fraudulent accounts, and cross-reference other accounts used by specific devices. In some cases, the online hosts may communicate with an authentication repository, which may also include a centralized database of gathered information, such as device identifiers or fraud history, that can be updated and shared.

Accordingly, computing devices involved in suspicious or fraudulent activity, or devices associated with accounts involved in suspicious activity can be identified. This information can be shared with other online hosts and networks within one or more consortia. In this way, computer devices associated with suspicious or fraudulent activity on one network may be denied access to other networks.

The invention may be applied to provide a fraud detection and prevention system that can significantly reduce the risk associated with Internet transactions and fraud. By sharing information about potentially fraudulent users or devices, and identifying user devices as well as their association with certain online activity, the system may allow businesses to avoid problem customers or devices associated with fraudulent activity. The system can track device activity and user behavior over selected periods of time, thereby identifying suspicious activity based on selected parameters established by online businesses.

Information shared across a consortium may include a delta of time parameter. The delta of time parameter may be shared directly and/or may be shared as part of a device identifier. The delta of time parameter may be calculated as a difference between a user device clock time and a reference time. A reference time may include an online business server clock time or a repository server clock time, which may be synchronized to a time, such as Coordinated Universal Time (UTC). Information shared across a consortium may also include personal and non-personal identification information, which may or may not be incorporated as part of a device identifier.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features and advantages of the invention may be further explained by reference to the following detailed description and accompanying drawings that sets forth illustrative embodiments.

FIG. 5A illustrates an implementation of the consortium with a reference time.

FIG. 5B shows a table with an example of the use of the consortium with a reference time.

FIG. 6A illustrates an additional implementation of the consortium with a reference time.

FIG. 6B shows a table with an additional example of the use of the consortium with a reference time.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods that identify users and/or user devices connecting to a network. The invention relates to one or more consortia of communication networks that share information about users or user devices. The invention is applicable to network security and the detection of fraudulent transactions and identity theft. It will be appreciated, however, that the systems and methods in accordance with the invention can have greater utility; for example, the invention may also be applicable to any system where a user or user device identification may be relevant. One aspect of the invention is creating associations, tracking behavior over time, and sharing information with multiple networks or businesses that stand to benefit from sharing this type of information.

The invention may be applicable to any type of transaction in which it may be desirable to identify a user or device. For example, the invention may be used to detect fraud being carried out by one or more network devices and user accounts over a communications network, or even detecting and preventing potential fraud or identity theft by individuals trying to complete a transaction remotely by phone or mail, or even in person. One aspect of this system and method is to associate pieces of information about a transaction, monitor these associations, and share the information about these associations with other businesses within one or more consortia.

Figure 1:
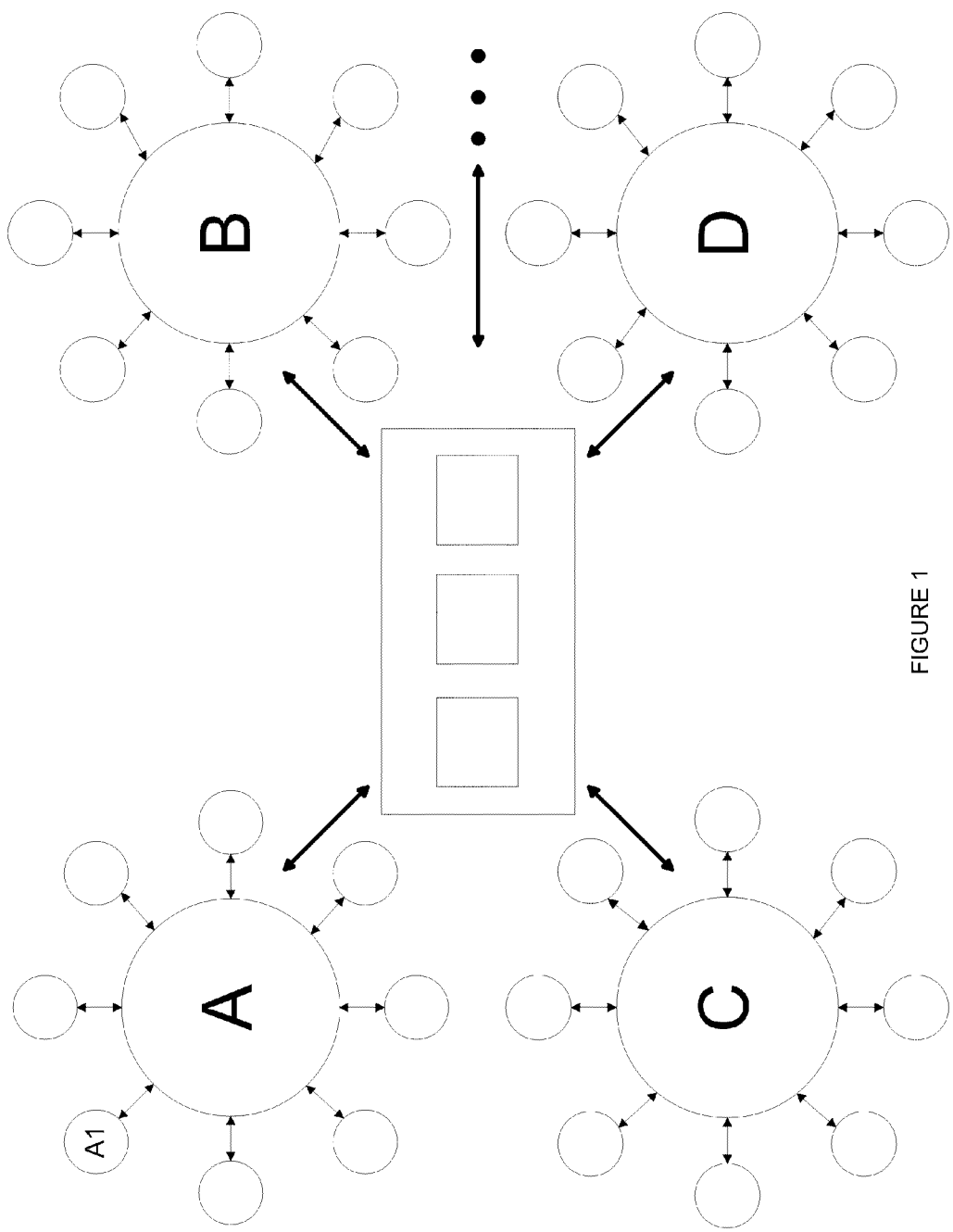
FIG. 1 is a diagram illustrating a consortium having one or more user devices being connected to one or more online businesses that share user device information with an authentication repository that is part of the consortium in accordance with the invention.

FIG. 1 is a diagram illustrating a consortium having one or more user devices being connected to one or more online organizations or hosts that share user device information with an authentication repository that is part of the consortium in accordance with one embodiment of the invention. The one or more user devices may include user computers whether they be a personal computer, server computer, or laptop computer; personal digital assistants (PDAs) such as a Palm-based device or Windows CE device; phones such as cellular phones; a wireless device such as a wireless email device or other device capable of communicating wireless with a computer network; or any other type of network device that may communicate over a network and handle electronic transactions.

The online organizations connected to the one or more user devices may be any sort of host, such as an electronic commerce business, an online merchant, a financial institution, or any other type of website service provider that may provide a service to a user or may interact with a user device. An online organization and a user device may perform an electronic transaction, such as a purchase of a product or service, such as online banking. In accordance with one aspect of the invention, each electronic transaction may be susceptible to fraud and each user device or user can be identified to reduce the risk of fraud.

The connection between a user device and an online organization may be, for example, a connection between a client computer and a website server over a network. One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. Each user device may connect to any online organization over the network using data protocols, such as HTTP, HTTPS and the like.

When a user device is communicating with the consortium, the device memory may store an operating system (OS) and a browser application. For example, the operating system may operate to display a graphical user interface to the user and permit the user to execute other computer programs, such as the browser application. The browser application, such as Microsoft Internet Explorer, when executed by the processor, permits the user to access the World Wide Web as is well known. The user device may interact with an online organization that is part of the consortium, which may perform some fraud prevention and detection functions and may generate a device identifier derived from information gathered about the user and/or user device in accordance with the invention.

In some embodiments, an online organization may have one or more web-based server computers, such as a web server, an application server, a database server, etc., that are capable of communicating with a user device over a network, such as the Internet or a wireless network, and are capable of downloading web pages to the user device. In some implementations, the online organization may comprise one or more processors, one or more persistent storage devices and a memory. For the online organization to interact with the user devices, the memory may store (and the processor(s) may execute) a server operating system and a transaction processing software system to facilitate an electronic transaction between the online organization and one or more user devices. Each online organization may further comprise a database, such as a database server or a data structure stored in the memory of the online organization, that stores the electronic transaction data for the online organization. In some embodiments, a server for an online organization may have greater computing or processing power than a user device. Similarly, the server may have more memory than a user device.

The online organization may control each device and/or each user's access to the resources of the online organization by, for example, denying access to a user or device in particular circumstances. For example, if a user device has been implicated in fraud, an online organization may prevent a transaction with the user device from occurring. In another example, if a user has a 'bad' or 'low' rating, an online organization may prevent the user from participating in an electronic sales forum.

In a preferable embodiment of the invention, the online organizations may be connected to an authentication repository. The authentication repository or fraud detection monitor that is part of a fraud detection consortium may be connected to the online organizations over a network. If the central repository is connected to the network, then the data between the online organizations and the authentication repository may be encrypted or may travel over a virtual private network to ensure privacy and security.

Thus, the authentication repository may receive user and/or user device information from each online organization, which may collect user or user device information from each user device during an online transaction. The repository may store some or all of the information received. In some implementations, the authentication repository may generate a device identifier that identifies each user device. In some cases, the device identifiers may be unique identifiers for each user device. In other cases, the device identifiers may not be unique for each user device, but may be derived from information gathered about a user and/or user device which may or may not be duplicative in another user device. In some cases, a device identifier may function as a "fingerprint" of a user device, and include various parameters derived from gathered information about a user and/or user device to be discussed in greater detail below.

Using the identification information in accordance with the invention, the authentication repository may be able to detect fraudulent activities across the consortium. In particular, the authentication repository may provide a centralized service utilizing this invention to identify user devices, store user and device information, track end-user logins, associate an end-user account with one or more specific devices, associate a device with one or more end-user accounts, associate a device or end-user with fraudulent activity, and share this information with each online organization of the consortium. The authentication repository may include a centralized database.

Any action taken within a fraud detection consortium may be directed by computer readable media, code, instructions, or logic thereof. These may be stored in a memory, such as the memory of an authentication repository or the memory for an on line organization.

In one example, a user computer, such as A1, may request access to the fraud detection consortium and a particular online business, such as A. To gain access to A, complete a transaction, or access a particular part of the network, a user may connect through a user device, which in this case may be user computer A1. The online business A may receive user and/or user information from the user computer and may then pass the information to the authentication repository. The online business may or may not store the information gathered through the user device that is passed onto the authentication repository.

In some implementations, the authentication repository may generate a computer identifier which may be derived from the information gathered. In other implementations, a computer identifier may be generated at different stages. For example, an online business A may gather information from A1 and may generate a computer identifier for A1, and may pass the computer identifier to the authentication repository. The online business A may only pass the computer identifier, may only pass gathered information, or may pass a combination of both to the authentication repository.

Information or data, such as a computer identifier, raw data, data used to make up the computer identifier, or any combination thereof may be stored in "pairs." Any type of data may be coupled with the same or different type of data when stored in memory. The paired data may be linked within memory where they are stored, or may have some other mechanism that associates them with one another. In one example, an email address and a computer identifier may be stored as a pair. The email address and computer identifier may be stored in memory together, as a unit of data. Alternatively, they need not be stored together but may include pointers that associate them with one another. Although the term "pair" may be used, any number of data items may be linked in memory. For example, two, three, four, five, six, seven, eight, ten, twelve, fifteen, twenty, thirty, forty, fifty, eighty, one hundred, two hundred, or more items may be linked in memory. As discussed in greater detail below, any of these linked sets of data may be shared together.

In one embodiment, the authentication repository may store some or all of the information. For example, the authentication repository may store all of the information gathered by online business A, B, C, D, and any other businesses in the consortium. Online businesses A, B, C, and D may or may not also store the information that is stored by the authentication repository. The authentication repository may share some or all of the information gathered or generated, such as computer identifiers or detected fraud information, with the online businesses of the consortium.

In an alternate embodiment, the fraud detection monitor or repository may facilitate transfer of information between one or more online business without actually storing the gathered information. For example, information gathered by online business A may be stored on A's server, and information gathered by online business B may be stored on B's server. The fraud detection monitor may enable transfer of information from A to B, C, D, and any other businesses and so forth for the other online businesses. The fraud detection monitor may also process information, with or without storing it on a fraud detection monitor server, such as generating computer identifiers or detecting fraud from information gathered from one or more online business, and may share this information with the online businesses of the consortium. The fraud detection monitor may detect fraud by cross referencing the gathered information and tracking user and device behavior over time. In some cases, the fraud detection monitor may only store processed information, such as computer identifiers or fraud indicators.

In some embodiments, each online business may represent different private network environments operated by independent organizations that do not share end-user identities. The data storage system, such as a set of databases, used by each online business may be remotely located at the authentication repository and can be a service provided by a third party. Alternatively, online businesses may communicate via a network, such as the Internet, such that end-user identifiers may be shared.

Another example provides fraud detection and information processing applications distributed across a plurality of computing devices (with no central authentication repository and database). The computing devices may be the online businesses' devices, the user devices, or a combination of the user devices and online businesses, such that each may perform part of the functions of the fraud detection and prevention system in accordance with the invention. For instance, the various online businesses may share information with one another in a peer to peer manner, and may collectively detect fraud. In one case, online business A may detect an at-risk user device and share this information with online businesses B, C, D, and so forth. Online businesses A, B, C, and D may share information in a peer to peer manner such that they all have access to certain information.

Those skilled in the art will appreciate that the fraud detection consortium may be implemented in various different manners that are within the scope of this invention, such that previous discussions are provided by way of example only and are not limiting.

One aspect of the invention provides for multiple consortia that may interact with one another and share information. For example, an authentication repository may communicate with another authentication repository. In some embodiments, information gathered from an online business may be shared between one or more authentication repositories, which may subsequently share the information with the other online businesses that they are connected to. In some implementations, the information shared between a first repository and second repository may be stored by both the first and second repositories before being distributed to connected online businesses. Alternatively, a repository may merely pass on information it receives from another repository. The information may be stored or shared in various ways that are known in the art.

For instance, any information stored by an authentication repository may be stored in one or more database of the authentication repository. In one example, the database may have a database table containing pertinent information. However, the data may be stored in different databases and may include different database data structures that are within the scope of this invention. In this example, a database table may include a host column, a unique user-account name, and a user device identifier column that may permit the fraud detection system to associate a particular host (or online business) with a particular user and a particular user device. As described above, the user-account name may represent end-user accounts that are unique to each host. The user device identifiers may represent user devices that have connected to at least one host. The individual rows in the database table may represent unique combinations of host, user-account names and user device identifiers. The database table may enable the same user connecting to a different online business with the same user device to be tracked and registered in the consortium. A great deal of additional information may be maintained such as last successful login date and time, last unsuccessful login date and time, total successful logins, total unsuccessful logins, etc. as well as any relevant personal and non-personal information, to be discussed in greater detail below.

As previously discussed, information may be stored in "pairs," which may refer to any number of data items that may be somehow linked or connected together. A database table, as mentioned previously, may be an implementation of storing data in pairs. In a consortia or multiple consortia, such information may also be shared in "pairs." For example, a particular host may always link together a credit card number and email address. Such information may be stored and shared as a pair. In some embodiments, each host may have uniform pairs of data that may be shared. For instance, all of the hosts within an online consortium may store together a credit card number and an email address. Similarly, any time a credit card number is shared or tracked across a consortium, an email address may also be shared and tracked with the corresponding credit card number. In another embodiment of the invention, different hosts may have different pairs of data that are shared (e.g., one host may always pair an email address with a username, and another host may always pair an email address with a delta of time parameter). Any of the data items or types, including computer identifiers, delta of time parameters, or other items discussed herein, may be paired.

When data is stored and tracked as a pair, fraud detection and validation may be improved. For example, if a pair of identifying data is stored, and then the same pair appears again, the device or individual can be identified with greater certainty as the same device or individual. Thus, consortia members may be able to share pairs of information to track a device or user.

Based on gathered information, and any information generated by processing the gathered information, such as a computer identifier, to be described in more detail, the likelihood of fraud being committed by a particular user with the user computer A1 may be determined and an appropriate action can be taken. Assuming the user computer A1 is granted access to the network, the user computer performs its electronic transaction. If a fraudulent activity occurs during that electronic transaction, that information may also be conveyed to the authentication repository and may be stored by the authentication repository. Alternatively, if fraudulent activity occurs, the information may be conveyed to the other online businesses. In this manner, the one or more online businesses may share fraud information between each other selectively so that a fraud committed against one online business, i.e. online business A, can be logged into and tracked by the authentication repository in accordance with the invention. Alternatively, information about fraudulent activity can be tracked by the consortium of online businesses without analysis by an authentication repository. Thus, a user or user computer that has committed fraudulent activities can be tracked even when the user or user device logs into a different online business, i.e. online business B. Therefore, the fraudulent activities of a user or user computer can be tracked across the consortium.

Some implementations of using an authentication repository in a consortium may involve repositories capable of handling various tasks. An authentication repository may be one or more stand-alone computing resource, such as a server computer, with a database or storage system, although the functions of the authentication repository and the information storage may be distributed in any number of ways, such as in examples described previously. The authentication repository may include one or more processors, one or more persistent storage devices and a memory. The authentication repository may further include a database server/manager that may store the data in accordance with the invention. The structure and operation of the processor, persistent storage device and memory may be any computing device structure as known in the art. The memory may store a server operating system, and one or more administrator module that are executed by the processor to implement the fraud detection and prevention.

An administrator module may permit an administrator to interact with an online business. For example, an administrator may determine the threshold for enabling a user to interact with the online business if the user may be at risk for fraud. An administrator may also configure items of the system, adjust query items and update items. An administrator module may also process the data stored or received by the repository, such as to generate a device identifier. An administrator module may enable an administrator to generate a query of, given a particular user device, what users have used that network device or a query that asks, given a particular user, what network devices have been used by the particular user. The administrator may also configure a query that asks, given a particular user device, what other online businesses set this network device to associate users/computers a predetermined number of levels deep or given a particular user, what is that user's current status in the system. An administrator module may perform additional administrative functions such as generating reports from the fraud detection and prevention system and its database.

In some embodiments, hosts, such as online organizations or businesses, may be able to individually control their interactions with user devices. For example, hosts may set up any number of device and user status levels, and establish any number of behavior patterns, each of which might require a different action, such as notify a particular email address, page a particular number, deny access to the network, allow access but change the status of the device, etc. In some cases, each host can establish its own customized rules for every aspect of the present validation method. Because of this, the same circumstances that result in denied access for an end-user for one host may not result in denied access for another host.

Alternatively, an authentication repository may control a host's interaction with a user device. For example, an authentication repository may determine whether a user device is at risk for fraud and may deny the user device access to the consortium. In some cases, the authentication repository's determination for fraud risk may be uniform for all hosts.

Identifying information may be used for other applications in addition to fraud detection and prevention or network security. For example, gathered information may relate to a user rating, which may or may not relate to fraud. Such information can be shared across one or more online businesses in a consortium, to track the user or user computer across the consortium. In another example, gathered identity information may have applications in national security and law enforcement.

The information gathered in accordance with the invention may be customized for different user device types. For example, with a personal computer that connects to an online business, the information gathered may include an IP address or browser ID and additional personal or non-personal information to identify the user device. With a cellular phone, it is typically possible to extract data from the cellular phone, such as its serial number, so that only non-personal information may be used to identify the cellular phone network device. For a PDA user device, it may be typically possible to put data/information onto the PDA only so that the certain parameters only may be used to identify the PDA. Thus, depending on the user device, different information may be gathered. In accordance with the invention, information may also be gathered from a hardware device, such as a smart card or PCM-CIA card, which may have its own unique identifier that may be used to uniquely identify the card. Thus, information gathering in accordance with the invention may be implemented in a variety of different manners.

A user device's information, which may include risk for fraudulent activity, may be shared with various hosts at various times or manners. For example, transaction information may be shared with all hosts whenever a transaction occurs. In another example, transaction information may be shared with all the hosts at particular times, i.e. updating each host every ten minutes, or whatever time an individual host may wish to be updated. Alternatively, transaction information may be provided to a host upon request by the host. For instance, if the information is stored with an authentication repository, a host may choose to automatically update and access repository information whenever a transaction occurs between the host and a user device. In some cases, individual hosts may be able to determine when or how they receive or send shared information. In other cases, information sharing may be uniform across a consortium.

For any of the systems and methods described herein, a consortium may operate taglessly. One or more consortia may be tagless when they do not require a program to be downloaded to a user device. For example, an online host and/or authentication repository may collect information about a user or user device without the use of cookies, text parcels, or programs sent from a server to a client computer. A fraud detection consortium may be able to detect fraud without downloading a fraud detection program to a user device. Rather, a consortium may operate taglessly by collecting information from a user device without requiring a user device to download additional applications from any of the hosts or repositories of the consortium. For example, instead of "pushing" an application or tag onto a user device, a consortium may enable data to be "pulled" or extracted from the user device.

Figure 2:
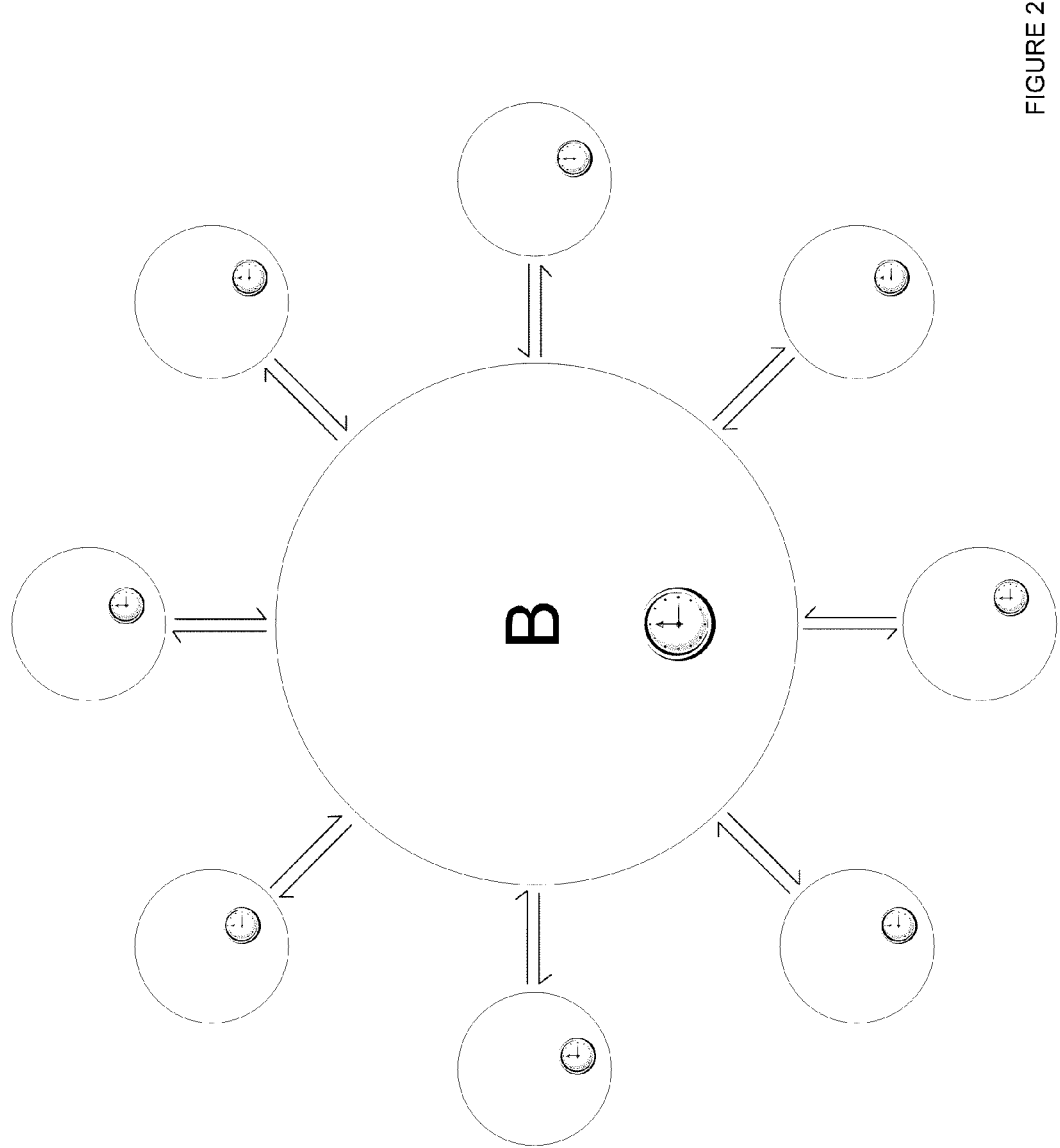
FIG. 2 is a diagram illustrating an example of an online institution connected to one or more user computer in accordance with the invention.

FIG. 2 is a diagram illustrating an example of an online institution connected to one or more user computers or devices in accordance with an embodiment of the invention. An online institution may gather information from a user computer. As discussed previously, the information may be gathered during an online transaction and may be used to identify a user and/or user device. In accordance with the invention, the consortium may utilize a user or device identifier, or any other data that may be used to identify a user or device. In some embodiments, a user may be identified based on a number of parameters. The parameters from the gathered information include a delta of time parameter, to be discussed further below. Other information or parameters may also be used to assist in identifying a user and/or user device. In some situations, it may be impossible to extract data from a user device so that only a generated device name can be used to identify the user device.

A delta of time parameter may be determined from information gathered during a transaction between a user device and an online institution. Such information may include a local time for a user device according to a clock of the user device. A local time may include a date, hour, minute, second, millisecond, or any other denomination of time. In one example, the clock of the user device may be a resident computer clock. In another example, a clock may be an external clock that determines the time of a user device. A user device may have one or more clock for determining a time of the user device. Information from one or more clocks may be collected. Such information collected may also include relevant time zone information, which may include information about Daylight Savings Time.

Other information may be gathered during a transaction between a user device and an online institution. For instance, upon making a connection, an online website receives some non-personal identification information from the customer device. In preferable embodiments, an online website may receive some non-personal information taglessly. This non-personal information typically includes Common Gateway Interface (CGI) parameters such as the customer's Internet Protocol (IP) Address and the computer's Browser ID. While "hackers" can change, disguise, and/or emulate the IP address to mask a fraudulent transaction, most do not now have the capability nor the idea to do the same for the Browser ID. While some "hackers" can change the Browser ID, it is not a trivial tool and if one needs to change it all the time it is not allowing those thieves to easily steal, hence, they are likely to go to a site that does not check Browser IDs.

In a typical embodiment, when a customer decides to purchase services, goods, or information from a website, the customer inputs additional, and more personal, identification information. This personal identification information may commonly include the customer's name, address, billing and shipping information, phone number, and/or e-mail address. Any other personal information, such as a customer's driver's license number, social security number, a personal identification number, retail purchase location, or any other information that may be captured as part of an online transaction could be used to identify and minimize transaction fraud and identity theft.

A website server can capture the local time of the customer's computer, typically through a program such as JavaScript, as well as a reference time. In preferable embodiments, the local customer computer time may be captured taglessly. The website may capture customer computer time using a script that may extract information from the customer computer, without pushing anything onto the customer computer. The script may be a server side script. The script may extract information by querying the customer computer. The script may be a time capture script from the website server for execution by the customer computer. The time capture script may instruct the browser of the customer computer to obtain selected information about the customer computer during an online connection, including a local time according to a clock of the customer computer, a non-personal identification parameter, and/or a personal identification parameter. The customer computer may accordingly provide selected information in response to the queries. The selected information collected by the time capture script, such as the local time of a customer computer clock may be returned to the website server in accordance with the time capture script. Thus, a clientless capture of information may be implemented by the server.

Typically the reference time may be the time of the server's computer. The time of a server's computer may include the local server time and any relevant time zone information, or the server may be synchronized to a set time, such as Coordinated Universal Time (UTC). The reference time may also be an authentication repository server time. This may be the local time for the authentication repository, or the repository time may be synchronized with a set time, such as UTC time. More details about capturing time to calculate a delta of time parameter will follow.

The server then calculates the time difference (or delta of time) between the customer's computer clock and the reference time, such as a server's computer clock. At the server, a delta of time parameter may be calculated based on a difference in time between the reference time (e.g., local server time, UTC time) and the local time of the customer computer clock received from the customer computer. This can be recorded in any desired format such as hours, minutes, seconds, or the like, but corresponds to a delta of time parameter. The delta of time parameter, the non-personal information, including but not limited to the preferred usage of the Browser ID, and/or the personal information are stored by the merchant and used to identify the customer and/or customer computer.

In accordance with one embodiment of the invention, the relative customer computer local time according to its resident clock may be captured, typically through a program such as JavaScript or any other time indicator employed by telecommunications and networking systems such as timestamps within transmitted data packets (e.g., TCP timestamps in packets within a data stream wherein each packet includes a header portion containing a 32-bit timestamp generated by a originating computer according to local resident time). The local time of a customer computer or client may be captured during any selected moment of action such as when the customer visits or is logging into a merchant site, at the time of a purchase or at times during an exchange of information that can be reflected in timestamp to data packets transmitted across a selected network or the Internet. Similarly, the time can be captured at multiple times during an online transaction.

In some embodiments, a merchant web server may also maintain and measure a relative website server time according to a server clock. The time difference or delta of time as between the customer computer clock and the server's computer clock can be therefore calculated. This approach in determining when to measure a time of action or event may be characterized as opportunistic in that measurements are taken at selected moments in time. The delta of time can be measured, calculated and recorded by the merchant web server or any other computer operating with or connected to the merchant online system, such as an authentication repository. The delta of time may be measured in any desired format or increments of time such as days, hours, minutes, seconds, milliseconds (microseconds) or the like. Over different periods of time, the delta of time parameters are generally persistent with relatively high degree of accuracy. Accordingly, the measured time difference between these computer clocks provides a parameter in accordance with this aspect of the invention that may link or associate a particular customer computer with transactions. The association of the customer computer with a transaction may help prevent fraud when a particular transaction may involve fraud.

The delta of time (Time Diff) parameter provided in accordance with this aspect of the invention may function alone or combined with other parameters to provide what may be characterized as a "PC fingerprint." Such devices include personal computers or any other type of computing devices or computers (hereinafter collectively PC). Each PC connected to the Internet may be configured slightly differently and may possess identifiable characteristics distinguishing it from other devices which can be exploited by the invention. A more accurate PC fingerprint may be generally developed by considering a greater number of available computer related parameters. The Time Diff parameter may serve as part of a PC fingerprint for identifying a device which serves as a distinctive mark or characteristic about a particular user device. In addition to a Time Diff parameter, the flow of information exchanged during an Internet session may be captured and provide significant information about the user PC on the other end. This type of information exchange considered by the invention is preferably invisible and transparent to users, and does not rely on user action or modification of online behavior.

The Time Diff parameter may thus link incidents involving fraud, hacking, phishing etc. by automatically correlating information such as login data, computer data and customer data. For example, by analyzing data sent from the user device, information about the device and browser used by an individual may be obtained such as a Browser ID, the Browser/device IP address and the particular Browser language. By formulating a more accurate PC fingerprint, there is less likelihood of mistakenly associating a user with a fraudulent transaction (false positive) during e-commerce transactions, or failing to detect a fraudster. Other applications of the invention include national security and law enforcement whereby a computer can be uniquely identified in a manner similar to way thieves can be identified by a physical fingerprint. Accordingly, a PC fingerprint provided by the invention enables the ability to link and connect different online accounts and activity to a same device.

The Time Diff parameter provided in accordance with the invention may be captured or measured during various selected moments of action during an Internet session such as the login step or procedure. This may include measuring the Time Diff parameter at multiple times during an online transaction, which may raise flags if the Time Diff parameter changes noticeably during an online transaction. Many e-commerce merchants, financial institutions, and Internet Service Providers (ISPs) manage accounts and user logins on an enormous scale. This aspect of the invention can be applied to broader applications online to authenticate a user or uniquely identify a computer on the Internet in addition to e-commerce transactions and fighting fraud or identify theft. For example, the invention may be applied where a merchant or financial institution (FI) server resides in California, USA and a valid customer (Customer) who also normally resides in California, USA. It shall be understood that the following examples below describe login procedures which could be modified according to the invention for any other selected moment of action during an Internet session such as logout procedures, when a user clicks a "submit" button within a user interface, or transmission of any other information between users online.

During a "valid" login procedure, the Customer may initiate a login procedure from a web browser on a computer that registers a time according to its clock as follows: Time=11:00 am/Time Zone: UTC −8 and an IP address from the California region. Meanwhile, from the perspective of the FI, the recorded time at the FI server according to its respective clock may be: Time=11:01 am/Time Zone: UTC −8 and an IP address from the California region. It shall be understood that the invention may incorporate IP address locator tools which determine an identifier for an online device and its location based on geographic regions within a country or around the world. Upon analysis of this information from the Customer that may be reflected on a conceptual or actual Score Card, which can be calculated and stored in memory within the server of the FI or any its other network computers, the FI can determine whether there is a match indicating a valid user login. Accordingly, the exchange of information in the above described example may be reflected as a match on or as a Score Card that measures the validity of the customer: Time Diff=Match/Time Zone=Match/IP=Match.

During a "suspect" login procedure, a Customer may initiate a login procedure from a web browser on a computer that registers a time according to its clock as follows: Time=10:02 pm/Time Zone: UTC +3 and an IP address from a region in Russia. Meanwhile, from the perspective of an FI, the recorded time at the FI server according to its respective clock may be: Time=11:01 am/Time Zone: UTC −8 and an IP address again from its California region. Upon analysis of this information from the Customer in accordance with the invention, the Time Diff and Time Zone measurements as between the Customer and the FI are different from prior valid logins and therefore not a match. Furthermore, the IP address received by the FI indicating a device outside of the California region would not be a match and further suggest an invalid login attempt by a fraudster or other unauthorized individual. The Score Card for this login example measuring the validity of the customer can thus show: Time Diff=No Match/Time Zone=No Match/IP=No Match. The FI would be thus alerted that the alleged Customer attempting to login was likely invalid.

During a "valid" login procedure from a Customer traveling with a computer and browser in London, the Customer may initiate a login procedure at a registered time according to its clock as follows: Time=11:00 pm/Time Zone: UTC −8 and an IP address from a region around London. Meanwhile, from the perspective of an FI, the recorded time at the FI server according to its respective clock may be: Time=11:01 am/Time Zone: UTC −8 and an IP address again from its California region. Upon analysis of this information from the Customer, the Time Diff and Time Zone measurements as between the Customer and the FI are the same as prior valid logins and therefore a match. While the IP address received by the FI indicating a device outside of the California region would not be a match and suggest an invalid login attempt, the comparison of the Time Diff and the Time Zone measurements would be a match. Because the Time Diff parameter provided in accordance with the invention can be used in combination with other fraud parameters for authentication and identification, a Score Card for this login example measuring the validity of the customer could still show a match nevertheless: Time Diff=Match/Time Zone=Match/IP=No Match.

The Time Diff parameter provides fraud detection tools for online merchants, financial institutions and other parties providing services on the Web. These tools can be applied to combat well recognized problems such as reducing the number of false positives which reduce possible revenue from mistakenly identified valid users. In addition, Time Diff based tools provide an effective solution to identifying and preventing fraud during the course of international and overseas transactions where there are significantly increased risks of fraudulent activity. Accordingly, the Time Diff parameters herein allow the creation of a more accurate and relevant geo-location or PC fingerprint for many different types of online transactions around the world.

It shall be understood that the Time Diff parameters provided in accordance in this aspect of the invention may be defined as the difference in the registered computer times as measured in any unit of time (e.g., days, hours, minutes, seconds, milliseconds, microseconds) between any selected computers either alone, or in combination with the Time Zone herein or any other temporal characteristics. Furthermore, as with other embodiments described herein, the concepts of the invention can be preferably applied to e-commerce transactions to deter or identify fraud but is not limited thereto and are equally applicable to any other online application to uniquely identify and link a computer device on the Internet according to a Time Diff parameter. While consideration of Time Diff parameters alone may not be completely effective as with any solution against fraud, phishing etc., the PC fingerprinting methods and techniques provided herein enables effective link analysis between computer devices and compromised accounts or any other transaction having or associated with a fraudulent past or history. By following and learning from historical incidents of security breaches and fraud, the invention can quickly pinpoint repeat offenders and build a stronger defense against different criminal behavior or schemes now known and those that will be developed in the future.

In accordance with some embodiments of the invention, a device identifier, such as a customer computer identifier may be generated for use in detecting fraud in connection with online commercial transactions. The customer computer identifier may be used to identify any user device. For instance, a merchant web server may receive customer personal information, such as name, address, phone number, etc. A web server may also receive non-personal information from the customer such as IP address and Browser ID. The web server may capture the local time and the time zone at the customer computer. The delta of time parameter may be calculated at one or more times during the transaction. It should be noted that the delta of time parameter may be calculated at the time of the customer login, other times during a transaction or at any selected moment of action. Using the customer information and the delta of time parameters, the customer computer identifier is determined. In some examples, a customer computer identifier may include all the data collected as fields, may be a hash of the data, a combination thereof, or any form of data derived from the collected data. Any one or more of these steps may be used in combination with each other and in a different order of operation depending on selected applications. It should be further understood that processes in accordance with this embodiment of the invention may provide a delta of time parameter and a computer identifier described elsewhere herein and also used together with other aspects of the invention.

In another preferable embodiment of the invention, a particular subset of selected parameters or fields can combined or aggregated to construct a customer computer identifier. For example, the customer computer identifier can be determined based on selected customer personal information, customer non-personal information, including a Browser ID and a delta of time parameter. These selected parameters are not meant to be limiting and other information or fraud parameters described herein or otherwise known to those of ordinary skill may be used to create a customer computer identifier. Specifically, another preferable embodiment of the invention includes a customer computer identifier consisting of a delta of time parameter plus a Browser ID alone which can be used to identify or "fingerprint" a user computer. The delta of time parameters provided in accordance with this and other aspects of the invention herein offer fingerprinting capabilities that uniquely identify particular computing devices used in online transactions. Because computer users rarely personally change the internal clocks within their computers, the delta of time parameter will likely be the same (or within a range or within predictable limits) for a computer every time that computer is used to conduct an online transaction with the same merchant even if the user disguises or changes the IP address. The Browser ID is also not likely to be changed, even by a consumer seeking to perpetuate a fraudulent transaction. Thus, the delta of time parameter (the difference between the time of day of the computer user's clock and a reference time) is an important component of the computer identifier because it, along with the preferred Browser ID or other personal or non-personal information, is a good indication of the identity of a subsequent user on the same computer. The delta of time parameter also allows the merchant to potentially locate the computer in terms of a time zone, region, or country.

An online organization or merchant may include, remove, and weigh each parameter within the computer identifier. For example, the merchant may choose to only use the delta of time parameter and Browser ID to form the unique computer identifier. Accordingly, the merchant may set a matching parameter to fit a level of comparison between a first and subsequent transaction. For example, since deltas of time may slightly change because of the differences in accuracy between the server and the user computer clock mechanism, computer clocks and deltas may slightly vary over time. The merchant may set the matching parameter to include a range of delta of time, such as a few minutes, instead of an exact match. This way, even if the user computer "loses time," the matching parameter can still identify the subsequent transaction as a potential fraudulent one based on other information within the computer identifier.

In a consortium with one or more online merchants, each merchant may be able to autonomously choose how to weigh each parameter of a computer identifier. Alternatively, in a consortium, a central repository may determine the weight of each computer identifier parameter for each of the online merchants.

Accordingly, once a merchant determines that a first fraudulent transaction may have been made, the merchant can flag the customer computer identifier, i.e. a Browser ID and delta of time. Thus, a customer computer may be correlated with a potentially fraudulent transaction based upon the customer computer identifier. In a preferred embodiment, the computer identifier may include at least its delta of time and Browser ID, but may also include other personal and/or non-personal information. Then, the matching parameter can be used to identify a subsequent transaction which reveals a user or device with an identical set of computer identifiers. The matching is typically implemented by software, for example, on a hard disk, floppy disk, or other computer-readable medium. The subsequent transaction may occur with the same merchant or another merchant in the consortium.

In some embodiments, once a merchant web server determines the computer identifier (CI) for a first transaction, $CI_1$ and a subsequent transaction, $CI_2$, a comparison can be made as between the two identifiers. The two transactions may or may not be with the same merchant. After the comparison has been made, a computer implemented software program may continue to execute the next step of assigning a matching parameter value to the pair of transactions based on the similarities between the first and subsequent transactions. The website server running the program to compare computer identifiers may inform a merchant of the matching parameter value, which in turn may provide information suggesting to cancel or confirm the transaction, inform the costumer status order, demand more information, or the like. The merchant may then choose its desired course of action. It shall be understood that the memory of a merchant web server may contain software programs with instructions to perform any combination of these steps to provide these and any other methods described herein in accordance with the invention.

Such a method may be used for a standalone merchant with customer computers or devices. Similarly, the method may be applied to one or more consortia. Either a merchant web server or an authentication repository may be determining the computer identifier and either may assign a matching parameter value. For example, the authentication repository may inform a merchant of a value and suggest confirming or denying the transaction. In some cases, the repository may determine a merchant's course of action. In one or more consortia, the matching parameter may be determined from information gathered from any transactions with any organizations in the consortia. Also, information gathered or processed by a merchant may be shared with other merchants in the consortia.

For instance, a series of computer identifiers, $CI_1$-$CI_4$, may be matched. When a CI is generated by a method or software program by a device to be identified or associated with a known fraudulent transaction, it can be compared to another selected CI. These CI's may or may not be from transactions with different online organizations in a consortium.

In one embodiment of how fraud detection may be implemented, during a comparison between two transactions, a matching parameter (MP) may be calculated. The calculated value of the MP may consist of a raw number or score that is dimensionless, e.g., 11.5, or some increment of measurement including time, e.g., hours, minutes, seconds, milliseconds. The matching parameter may be thus compared in a next step to a preselected reference or baseline Matching Value (MV), e.g., 10.0. A merchant or anyone trying to identify the computer can variably set the MV relative to anticipated or measured MP values. Because of slight differences in computer clocks, network latency, variable Web traffic and bandwidth constraints, the delta of time parameters provided herein may vary from time to time even for the same selected computer. A preselected range (delta t) may be therefore defined in accordance with this aspect of the invention that allows for a certain tolerance setting or range (Range) of MP values relative to the MV. For example, a lower limit within the Range may allow for a [±1] variance of the MP value relative to the MV, or a higher limit within the Range may allow for a [±5] variance. When the MP value falls within the defined Range relative to the MV, this can indicate a positive match or identification (ID) of a device for various purposes as described herein such as linking a computer to known online fraudulent transactions. When the MP value falls outside of the defined Range relative to the MV, this can indicate a negative match or identification (ID) of a device. It shall be understood that these MP values may be alternatively defined as a Score Card value and incorporated with other corresponding aspects of the invention described elsewhere herein to detect and prevent online fraud. The matching parameters, values and ranges described in accordance with this variation of the invention can be modified and defined in a variety of ways and are not limited to those specifically provided for illustrative purposes. The preceding steps may be carried out as methods provided herein, or alternatively as a series of software program instructions and code.

In identifying a user device, some change in a device identifier or fingerprint may be permitted. For example, "system drift" must be considered as individual elements that are used to derive a device identifier can change over time. In one instance, additional elements not present in the original device identifier, such as a new piece of software or hardware has been installed, are not worrisome. In these cases, the device identifier is updated, and the changes noted. However, changes to existing individual device identifier values may be more worrisome. In accordance with the invention, each online host may establish rules for system drift, such as which one or more elements of the device identifier the host perceives as critical and therefore should not be changed without causing an exception/error message. For example, the serial number of the central processing unit may be considered critical and therefore will generate an error message while a change in the amount of memory in the network device alone may not raise a flag. As another example, several non-critical elements of the network device may be changed without raising any concern. Thus, depending on rules established and maintained by each online host or authentication repository, a fraudulent transaction may be detected and not be confirmed.

Furthermore, in accordance with another example of system drift, the delta of time parameter may be measured as between different times resulting from inherent limitations or flaws of the computer clock(s) in a single device as opposed to multiple devices. In this embodiment of the invention, a device fingerprint or PC fingerprint is created to identify and link a computer to known fraudulent transactions or behavior by measuring and tracking an inherent inaccuracy or flaw of a resident clock. In comparison to other embodiments of the invention, which may be described as an "external" delta of time as between two different devices (host server/user client), another variation provided herein provides a device identifier using what may be considered an "internal" delta of time as between a single device itself (standalone). Over a period of time, computers clocks as with other ordinary clocks are not perfect and tend to run fast or slow eventually. The rate at which time is gained or lost for a computer clock may be defined as "clock skew" and can be measured in microseconds per second (clock skew may be also defined as the instantaneous difference between readings of any two clocks or the time what a computer thinks it is as compared to another clock). The clock skew may be considered when matching delta of time parameters from different transactions, and may be a way of offsetting a perceived error.

If the clock has a non-zero skew, not only is the end-to-end delay measurement off by an amount equal to what can be defined as clock offset, it also gradually increases or decreases over time depending on whether it is running relatively faster or slower. Even when there is a constant clock skew, the clock offset values increases or decreases over time depending on the sign (±) of the skew. So any given computer or device described herein can have a single or multiple clocks (e.g., systems clock, TCP timestamps options clock) that are unable to remain consistent and accurately track time. But the clock skew of a particular device may be different from other (even seemingly identical) computers, and thus serve also as a PC fingerprint linking it to certain transactions and fraud. It is generally well known that different computer systems have different and relatively constant clock skews. This imperfection or flaw in the device can thus be exploited in a way to identify a particular device or computer in relation to certain transactions and behavior since it is relatively persistent and unique in accordance with the invention. The internal delta of time provided in accordance with this embodiment can be therefore applied in the same manner as any other external delta of time described elsewhere herein to provide a PC fingerprint linked to transactions carried out on devices involving e-tail or e-commerce fraud, breaches in security and various types of criminal online behavior.

The internal delta of time can also be calculated to offset and account for apparent changes in the external delta of time parameter over time. In other words, clock skew may also be an example of system drift and may be factored in comparing external delta of time parameters.

In this embodiment of the invention, the delta of parameter can be measured in units of microseconds per second (ms/s, first derivative or rate at which time is gained or lost) while in other embodiments of the invention the parameter can be measured in microseconds. This delta of time parameter can therefore be defined as a time difference measured between a first clock measurement and a second clock measurement over a selected period of time or time interval. For example, the TCP timestamp of a first packet of data from a computer may indicate a time $t_1$ (9:01 am) while a second packet may be sent at time $t_2$ (9:02 am). The first and second packets may arrive at a server at times $t_3$ (9:04 am) and $t_4$ (9:07 am), respectively. The clock skew of the computer can be thus calculated as the rate at which time is lost in this instance: $t_3-t_1=3$ mins; $t_4-t_2=5$ mins (may assume time differences are not attributed to network delays, latency etc. beyond clock skew). The internal delta of time parameter or clock skew in the context of this embodiment of the invention herein may be calculated as follows: 5 mins−3 mins=2 mins divided by 3 mins (which is the selected period of time between first and second packets). In other words, during the 3 mins of time between sending the first and second data packets, the computer clock lost or ran slow 2 mins (0.666 min/min). While clock skew in general is instead measured on the order of microseconds rather than minutes, this example illustrates how these and other embodiments of the invention are not limited to certain ranges. Other units of measurements are applicable to the delta of time parameters as mentioned elsewhere herein. It shall be understood that both internal and external deltas of time can be applied individually or in combination by themselves, or in addition to other parameters as described herein to provide a distinctive PC fingerprint.

In accordance with some embodiments of the invention, sharing user and/or user device information within one or more consortia may result in the collection of information in different formats. For example, various user devices may store dates and times in different formats. One device may store a date as July 1, 2006 3:00:00 PM, while another device may store the date as 07/01/2006 15:00:00. In order to share data from different devices which may have different formats, consortium may have a data normalization method which may standardize the data to a common format.

In some embodiments an online host may standardize the information gathered from one or more user devices. Furthermore, in some embodiments of the invention, an authentication repository may standardize the information gathered from one or more hosts. In other embodiments, the online hosts of a consortium may standardize the information gathered from user devices in the same manner, such that they are already standardized with respect to one another.

Similarly, when one or more consortia are in communication with one another, the information gathered from user devices may be normalized. This may occur at the host level, or at the authentication repository level, or any other level. For example, when multiple authentication repositories are communicating with one another, the repositories may normalize the collected data in a consortium, and when communicating with another authentication repository, may convert the data from another authentication repository into a standard format to share with the hosts of its own consortium. Any data formatting system or method may be set up or developed in order to accommodate the sharing of information from multiple sources across one or more consortia.

Figure 3:
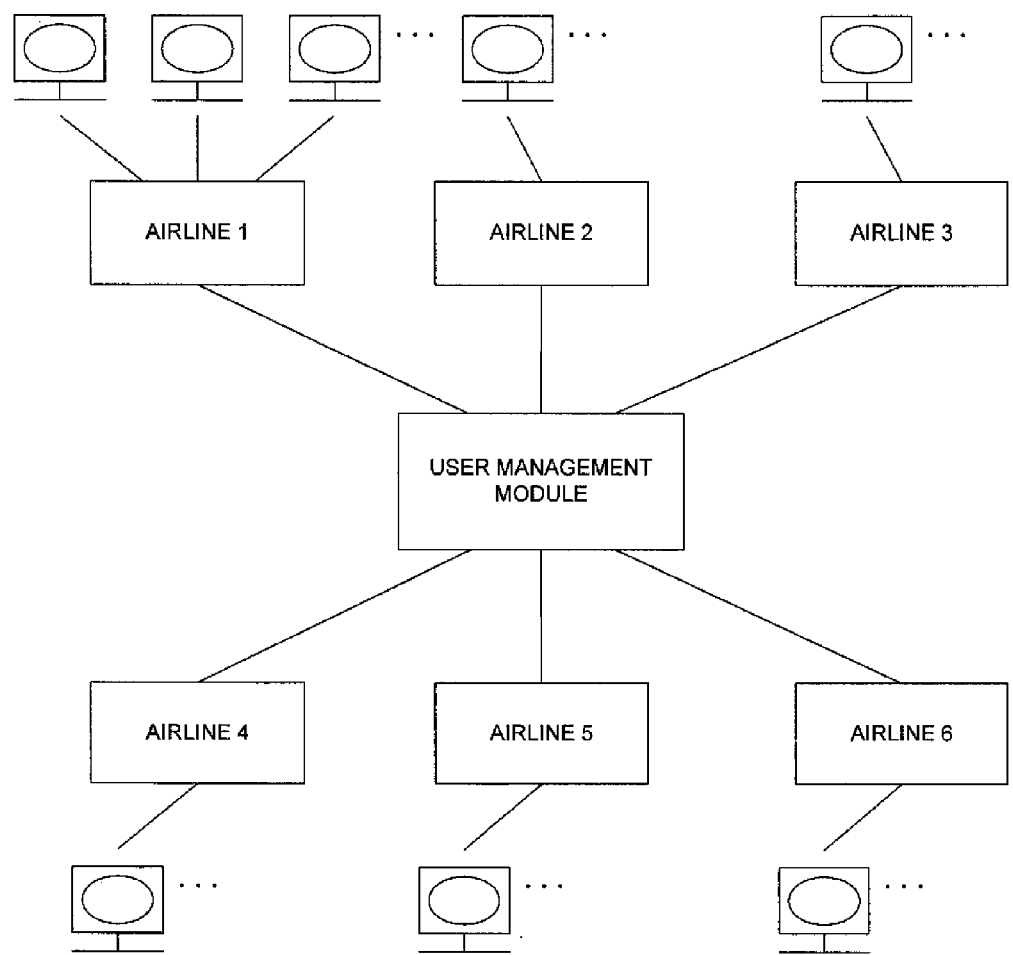
FIG. 3 shows an implementation of sharing data within a user group.

FIG. 3 shows an exemplary implementation of the consortium. A plurality of organizations, such as Airlines 1-6 may be part of a user group, where the members of the user group may agree to share selected data. For example, each of the airlines of the user group may agree to share fraud-related data. Each airline of the group may interact with one or more device. For example, user computers may access a server of an airline. In some embodiments, the same user computers may interact with multiple airlines. Any description herein relating to an airline (or figures referring to airlines) may also be interchangeable with a banking organization, any other financial institution, a merchant, or any other organization.

The user group may also include a user management module. The user management module may allow members of the group (such as the airlines) to agree to share selected fraud related data. In some embodiments, the user management module may facilitate the actual sharing of data. For example, the user management module may store some of the fraud related data. Alternatively, the user management module may assist with the transfer of data from one airline's server to another airline's server. In other embodiments, it may assist with running the user group without actually implementing the data sharing.

The airlines may be sharing any data with one another. For example, the airlines may be sharing computer identifiers (CI) with one another. A CI can consist of one or more personal and non-personal parameters. An example of a non-personal parameter may be a delta of time parameter. The airlines may share any other personal or non-personal data, which may include name, credit card number, email address, home address, or any other fraud-related data as discussed herein.

A user management module may obtain data elements that may be shared across the user group. The shared data elements may include personal in formation, such as email address, billing address, name, etc., as well as non-personal information, such as PCPrint information, which may be extracted from a device and be based on a composite of the information extracted from the device. In some embodiments a PCPrint may be a hash string based on information collected from the device. In some embodiments, a delta of time parameter may be obtained separately or in addition to the PCPrint. The combination of the PCPrint and delta of time parameter may or may not be hashed.

Preferably, data collected to form a computer identifier, such as a PCPrint may be extracted from a device. Data may be extracted without downloading an application or otherwise providing a client to the device. Thus, the system may operate taglessly. A computer identifier or other parameters may function differently from a tag, in that they are not a number or value pushed onto a device. Rather, information may be pulled from the device to form the computer identifier, or any other identifying parameter. The system may be operating clientlessly.

Figure 4:
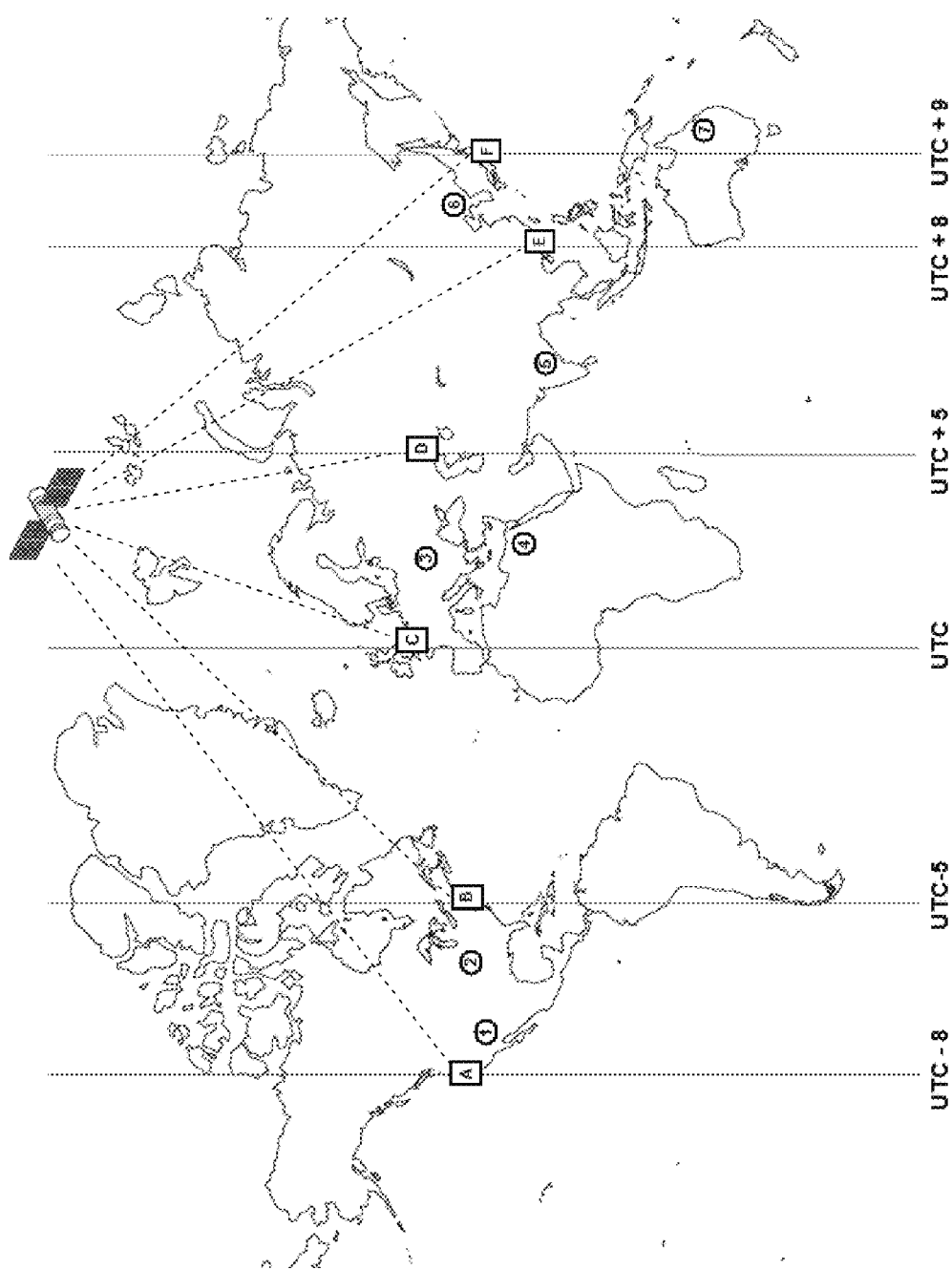
FIG. 4 illustrates an implementation of the consortium in a global setting.

FIG. 4 illustrates an implementation of the consortium in a global setting. When calculating a delta of time parameter for a user device in a consortium where a user device may interact with one or more online hosts, accommodations may be made to enable a consistent delta of time calculation between the user device and multiple hosts.

A challenge may arise when multiple online host servers have different clock times or are located in different time zones. For example, server A may be located at a time zone that is UTC −8, server B may be located a time zone that is UTC −5, server C may be located at a time zone that is UTC, server D may be located at a time zone that is UTC +5, server E may be located at a time zone that is UTC +8, and server F may be located at a time zone that is UTC +9. The various online host servers may be located anywhere in the world, such that some or all of the servers may be in different time zones. Similarly, various user devices may be located globally as well. For example, client computers 1-7 are scattered throughout the world. Client computers may be able to interact with one or more servers, which may or may not be in different time zones.

Using the previously described embodiment of the invention of calculating a delta of time parameter by taking the difference between the client computer time and the host server local time may result in discrepancies within a consortium if a standardized time is not used. For example, if a server A is located at UTC −8, and a server B is located at UTC −5, and client computer 1 is located at UTC −7, a delta of time between client computer 1 and server A may be +1, while a delta of time between client computer 1 and server B may be −2. If this information is shared within the consortium, it will appear that client computer 1 has inconsistent delta of times. Various embodiments of the invention may be used to accommodate calculating a delta of time parameter within a consortium.

As discussed previously, a website server can capture the local time of the client computer, as well as a reference time. In some embodiments of the invention, the reference time may be the time of the server's computer. The time of a server's computer may include the local server time and any relevant time zone information, or the server may be synchronized to a set time, such as the authentication repository time or UTC time. For example, in some cases, the website servers in a consortium may all automatically be synchronized to a time. For instance, the authentication repository may cause the website servers to synchronize to an authentication repository time, which in some cases may be synchronized to UTC time.

The synchronization may occur by any methods known in the art. In one example, the servers may be synchronized via a satellite or satellite network. In another example, software may be used to synchronize the servers. In some implementations, the website servers may be synchronized to a reference time, such as UTC time, by asking them to voluntarily synchronize their clocks to the reference time.

In other implementations, the website servers may be synchronized such that they are synchronized to their local time—i.e. when it is precisely 9:00:00 AM in California, server A may be synchronized to be 9:00:00 AM, while server B may be synchronized to be precisely 12:00:00 PM. When calculating a delta of time parameter, the relevant time zone information of the servers may be taken into account. Similarly, in some other implementations, the website servers may not be synchronized at all, such as server A may think it's 9:00:00 AM in California, while server B may think it's 12:00:45 PM in New York. The offset between the two servers may be tracked and be taken into account. In some cases, the authentication repository may keep track of the difference in times between the various servers.

In some embodiments of the invention, the reference time may be an authentication repository time. For example, a delta of time parameter may be determined by the difference between the client computer and the authentication repository time. In some cases, the authentication repository time may be synchronized with a global time, such as UTC, and the delta of time parameter may be the difference between the client computer and UTC. In some other cases, an authentication repository time may be an authentication repository local time, or an arbitrary time.

One implementation of the invention taking relevant time zone information into account is illustrated in greater detail. For instance, a delta of time parameter may be calculated between a local client time and local host server time with relevant time zone information taken into account. Each local time for any client or server connected to the Internet or other network system can be measured according to the clock for that particular device. The measured Delta Time parameter for any selected moment of action in accordance with the invention may be perceived as having two temporal components: an actual time and a time zone. For example, the measured local time at a client site may include a Browser Time of Feb. 1, 2005 14:00:00 PM, and a Browser Time Zone of UTC −8. In one example, a measured local time at a server site may include a Server Time of Feb. 1, 2005 17:01:13 PM, and a Server Time Zone of UTC −5. The Delta Time as between the Browser Time and the Server Time, and the Browser Time Zone in comparison to the Server Time Zone, can be therefore calculated in accordance with the invention.

A preferable embodiment of the invention provides a Delta Time or time differential which takes into consideration daylight saving time (DST) in selected time zones and countries around the world. In addition to collecting respective local times and time zones from clients or customer computers and website servers at a current selected date or moment of action, a website server or any other network computer can also capture information relating to particular time and time zones for selected (future or even past) dates. A selected Delta Time during DST (DST Delta Time) can be determined for a particular customer or client computer when the registered time for such other date is different than the current selected date. For example, the Delta Time value for such other date(s) can be +/− one hour ahead or behind. For time zones that do not observe DST, the Delta Time value will remain unchanged during such dates when DST would be normally observed. By calculating and identifying values for Delta Time and relevant Time Zones for multiple dates ahead of time in accordance with the invention, accurate delta of time values can be provided to assist in uniquely identifying or fingerprinting a client or customer computer throughout the year regardless of whether DST is observed in the relevant country or region of the world. Because only certain countries and regions of the world observe DST while others do not, it may be possible to pinpoint in which location the device resides based at least in part on the geo-location fingerprints provided by the invention.

DST (also called Summer Time) is the portion of the year in which the local time of a region is usually advanced by one hour from its official standard time. This system was originally intended to "save" daylight, as opposed to "wasting" time (for example, by sleeping past sunrise). The official time is adjusted forward during the spring and summer months, so that the active hours of daily life involving events such as work and school will better match the hours of daylight in theory. Today approximately 70 countries utilize DST in at least a portion therein—the only major industrialized country not to have introduced daylight saving is currently Japan. DST begins for most of the United States of America at 2:00 AM on the first Sunday of April and clocks are turned (spring) forward one hour. Time reverts to standard time at 2:00 AM on the last Sunday of October and clocks are turned (fall) back one hour. Each time zone switches to and from DST at a different time. Furthermore, legislation may be passed by Congress and other state governmental bodies from time to time on whether to observe, shorten or lengthen DST. DST for the United States of America and its territories is not observed in Hawaii, American Samoa, Guam, Puerto Rico, the Virgin Islands, most of the Eastern Time Zone portion of the State of Indiana, and the state of Arizona (except the Navajo Indian Reservation which does observe DST). Meanwhile, for all countries in the European Union except Iceland, Summer Time begins and ends at 1:00 AM Coordinated Universal Time, UTC which generally starts on the last Sunday in March, and ends the last Sunday in October. All time zones change at the same moment in the EU. It shall be understood that observance of DST is controversial and ever changing so the delta of time parameter provided in accordance with this embodiment of the invention can be flexibly adapted to devices all over the world when it changes and whether or not DST is observed in certain countries or states within particular time zones.

In this embodiment of the invention, various time zones can be predetermined such that it is known ahead of time whether or not DST is applicable for that region. For example, a Delta Time parameter may be calculated for a client computer at some future date(s) during DST. When the clock of a client computer registers a time of 8:00 PM PST (Coordinated Universal Time UTC −8) on a selected date during the fall season, its respective delta of time is changed one hour ahead to 9:00 PM PST (UTC −8) on a selected date in the spring season to account for DST when applicable. By collecting and determining times at one or more selected dates in the future, it is possible to determine whether a device will or will not go into DST from the beginning rather than waiting until later to see whether the registered time is the same or different. This will also assist in identifying the country or region for a selected user device. Accordingly, seemingly unrelated transactions can be linked at least in part from a distinctive timestamp delta of time (Delta Time) that can be measured from the internal clock or data (TCP, NTP, RTP etc. timestamps within data packets) sent from the device. It should be understood that the Delta Time parameter can be calculated according to any selected units of time as with other embodiments of the invention herein such as days, hours, minutes, seconds, or milliseconds.

FIG. 5A illustrates an implementation of the consortium with a reference time. Server A may be located at a time zone that is UTC −8, and server B may be located a time zone that is UTC −5. User device 1 may be located at a time zone that is UTC −7 and user device 2 may be located at a time zone that is UTC −6.

FIG. 5B shows a table with an example of the use of the consortium with a reference time. For instance, user devices 1 and 2 may interact with server A. In one transaction, server A's local time may be Jan. 1, 2008 9:00 AM while user device 1's local time may be Jan. 1, 2008 10:00 AM. Additional information about the user computer may be stored in any format, which in some cases may include a hash string. In some embodiments of the invention, a delta of time may be calculated as the difference between the user device local time and the server local time, which in this case would yield an initial delta of time value of +1 hours. In another transaction, server A's local time may be Jan. 1, 2008 9:05 AM while user device 2's local time may be Jan. 1, 2008 11:05 AM. If calculating the difference between the user device local time and the server local time, an initial delta of time value may be +2 hours.

However, as previously discussed, when a user device may interact with multiple servers which may not have the same time, challenges for calculating the delta of time may arise. For instance, user devices 1 and 2 may also interact with server B. In one transaction, server B's local time may be Jan. 1, 2008 11:00 AM while user device 1's local time may be Jan. 1, 2008 9:00 AM. If calculating a delta of time as the difference between the user device local time and the server local time, an initial delta of time value for user device 1 would be −2 hours. In another transaction, server B's local time may be Jan. 1, 2008 11:05 AM while user device 2's local time may be Jan. 1, 2008 10:05 AM. If calculating a delta of time as the difference between the user device local time and the server local time, an initial delta of time value for user device 2 would be −1 hours. This shows a discrepancy may exist in information shared between servers A and B, where for servers A and B, user device 1 has an initial delta of time value of +1 hours and −2 hours respectively, and user device 2 has an initial delta of time value of +2 hours and −1 hours respectively.

In some embodiments, the relevant time zone information is considered and accounted for in the delta of time parameter. For example, the difference between a server time and a consortium time may be used to offset the initial delta of time value. For example, if the consortium time is UTC time, a time difference between server A and UTC may be −8 hours, and a time difference between server B and UTC may be −5 hours. The offset may be added to the initial delta of time value, which for both servers A and B would yield a delta of time parameter of −7 hours for user device 1 with respect to the consortium time, and a delta of parameter of −6 hours for user device 2 with respect to the consortium time. Thus, in some embodiments, adding a delta of time between a local server time and consortium time to a difference between a user device time and a local server time may yield a delta of time parameter for a user device with respect to the consortium time.

In a preferable embodiment, clocks of servers A and B may be synchronized to a consortium reference time, such as UTC. During a transaction between server A and user device 1, user device 1's local time may be 10:00 AM while the consortium time may be Jan. 1, 2008 5:00 PM. A delta of time parameter may be calculated as the difference between user device 1's local time and the consortium time to yield a delta of time of −7 hours for user device 1. During another transaction between server A and user device 2, user device 2's local time may be 11:05 AM while the consortium time may be Jan. 1, 2008 5:05 PM. A delta of time parameter may be calculated as the difference between user device 2's local time and the consortium time to yield a delta of time of −6 hours for user device 2.

Similarly, during a transaction between server B and user device 1, user device 1's local time may be Jan. 1, 2008 9:00 AM while the consortium time may be Jan. 1, 2008 4:00 PM. A delta of time parameter may be calculated as the difference between user device 1's local time and the consortium time to yield a delta of time of −7 hours for user device 1. During another transaction between server B and user device 2, user device 2's local time may be Jan. 1, 2008 10:05 AM while the consortium time may be Jan. 1, 2008 4:05 PM. A delta of time parameter may be calculated as the difference between user device 2's local time and the consortium time to yield a delta of time of −6 hours for user device 2. The delta of time parameters of user devices 1 and 2 may be consistent between servers A and B because servers A and B are synchronized to a consortium time.

FIG. 6A illustrates an additional implementation of the consortium with a reference time. Server A may be located at a time zone that is UTC −7, and server B may be located a time zone that is at UTC time. User device 1 may be located at a time zone that is UTC −5.

FIG. 6B shows a table with an additional example of the use of the consortium with a reference time. For instance, user device 1 may interact with servers A and B. In one transaction, server A's local time may be Jan. 1, 2008 8:00 AM while user device 1's local time may be Jan. 1, 2008 10:00 AM. In some embodiments of the invention, a delta of time may be calculated as the difference between the user device local time and the server local time, which in this case would yield an initial delta of time value of +2 hours. In another transaction, server B's local time may be Jan. 1, 2008 4:00 PM while user device 1's local time may be Jan. 1, 2008 11:00 AM. If calculating a delta of time as the difference between the user device local time and the server local time, an initial delta of time value for user device 1 would be −5 hours. Again, this shows a discrepancy may exist in the information shared between servers A and B.

In some embodiments, the relevant time zone information is corrected and accounted for in the delta of time parameter. For example, the difference between a server time and a consortium time may be used to offset the initial delta of time value. For example, if the consortium time is UTC time, a time difference between server A and UTC may be −7 hours, and a time difference between server B and UTC may be 0 hours. The offset may be added to the initial delta of time value, which for both servers A and B would yield a delta of time parameter of −5 hours for user device 1 with respect to the consortium time. Thus, in some embodiments, adding a delta of time between a local server time and consortium time to a difference between a user device time and a local server time may yield a delta of time parameter for a user device with respect to the consortium time.

This principle may apply in any situation where the servers are not synchronized. For example, server times may be determined by their own clocks, which may or may not be accurate. Adding a time difference between the server time and consortium time to the difference between a user device time and server time may yield a delta of time parameter for a user device with respect to the consortium time, irrespective of whether a server clock is accurate or not. However, the time difference between the server time and consortium time must be tracked in order to calculated offsets.

In a preferable embodiment, clocks of servers A and B may be synchronized to a consortium reference time, such as UTC. During a transaction between server A and user device 1, user device 1's local time may be Jan. 1, 2008 10:00 AM while the consortium time may be Jan. 1, 2008 3:00 PM. A delta of time parameter may be calculated as the difference between user device 1's local time and the consortium time to yield a delta of time of −5 hours for user device 1. Similarly, during a transaction between server B and user device 1, user device 1's local time may be Jan. 1, 2008 11:00 AM while the consortium time may be Jan. 1, 2008 4:00 PM. A delta of time parameter may be calculated as the difference between user device 1's local time and the consortium time to yield a delta of time of −5 hours for user device 1. The delta of time parameters of user device 1 may be consistent between servers A and B because servers A and B are synchronized to a consortium time.

In another embodiment of the invention, a delta of time parameter may be calculated between the user device local time and an authentication repository time. For instance, the delta of time parameter may be calculated as user device 1's time minus repository time X. Repository time X may be the consortium reference time, which in some implementations may be UTC time. However, regardless of what the actual value of X is, during a first transaction between server A and user device 1, user device 1's local time may be Jan. 1, 2008 10:00 AM while repository time may be X. A delta of time parameter may be calculated as Jan. 1, 2008 10:00 AM−X hours for user device 1. Similarly, during a second transaction that occurs 1 hours later between server B and user device 1, user device 1's local time may be Jan. 1, 2008 11:00 AM while the repository time may be X+1:00 hour. A delta of time parameter may be calculated as Jan. 1, 2008 11:00 AM−(X+1 hour)=Jan. 1, 2008 10:00 AM−X hours for user device 1. The delta of time parameters of user device 1 may be consistent between servers A and B when the delta of time is taken between the user device and authentication repository.

As discussed previously, a consortium time may be any reference time, which in some cases may be the UTC time. Also, any other reference time may be used, including an arbitrary time, or an authentication repository clock time, which may be the local time according to an authentication repository clock or which may be synchronized to another time, such as UTC time.

Another aspect of the invention provided herein extends to detecting and preventing fraudulent transaction based on information obtained through "scams" or deceptive practices developed to gain personal, confidential and/or financial information. For example, a common technique today known as "phishing" involves gaining personal information from an individual to commit identify theft by typically using fraudulent e-mail messages that appear to come from legitimate businesses. "Phishing" can be defined as the act of sending an e-mail to a user falsely claiming to be an established legitimate enterprise in an attempt to scam the user into surrendering private information that will be used for identity theft. The e-mail often directs the user to visit a website where they are asked to provide or update personal information, such as passwords and credit card, social security, and bank account numbers, that the legitimate organization already has. But the website to which the user is directed is phony and established to steal the user information during a fake session. For example, a widely recognized website, e.g., eBay, can be targeted in a phishing scam whereby users received e-mails supposedly claiming that the user account is about to be suspended unless they clicked-on a provided link and updated the credit card information that the genuine website already had. Because it is relatively simple to make a website look like a legitimate organizations site by mimicking the HTML code, people can be tricked into thinking they were actually being contacted by the website and will subsequently go to the fraudulent site to update or provide their account information. Moreover, by spamming large groups of people (or spIMming them which spam sent over Instant Messaging (IM) applications that can include links to fake sites), the "phisher" could rely on a response from at least some percentage of people who actually had listed credit card numbers with the website legitimately. The concept of phishing in general can also referred to as brand spoofing or carding, a variation on the idea whereby bait is set with the hope that some will bite despite most individuals knowing better. By way of these seemingly legitimate e-mails, criminals "go fishing" for information which is in turn later used to gain access to a real account. Such information includes commonly stolen items in identify theft including a personal identification number (PIN), user account name, a credit card number, and an account number. Regardless of how this information is obtained, the fraud detection and prevention systems provided herein incorporate unique fraud parameters such as delta of time and clock differential parameters to "phish"-out fraudsters from legitimate users.

The criminal act that is often committed after information is "phished" can be ultimately referred to as "account takeover." These scams are commonly committed by e-mail to users at least partially because millions can be rapidly and efficiently sent to random or selected individuals, but other techniques can involve transmission of a virus through attachments to e-mails. In particular, some viruses can be created to replace the universal resource locator (URL) of a merchant, financial institution or other party commonly stored in a web browser "Favorites" folder. Instead of being routed to an intended legitimate website, the user is sent to a fake or spoofed site where user information is shared unknowingly with a fraudster. Similar in nature to e-mail phishing, another Internet scam referred to as "pharming" seeks to obtain personal or private (usually financial related) information through domain spoofing. Rather than being spammed with malicious and mischievous e-mail requests for you to visit spoof websites which appear legitimate, pharming can "poison" a DNS server by infusing into it false information resulting in a user request being redirected elsewhere. A browser however will indicate the correct website location, which can make pharming a bit more serious and more difficult to detect. A distinction however is that generally phishing attempts to scam people one at a time with an e-mail while pharming allows the scammers to target large groups of people at one time through domain spoofing. Meanwhile, "spoofing" basically includes a variety of ways in which hardware and software can be fooled into operating as if there was a legitimate transaction or exchange taking place. "IP spoofing" more particularly involves trickery that makes a message appear as if it came from an authorized IP address, e.g., e-mails spoofing. As a result, access can be gained to computers through IP spoofing when an intruder sends messages to a computer with an IP address indicating that the message is coming from a trusted host. To engage in IP spoofing, a hacker must first use a variety of techniques to find an IP address of a trusted host and then modify the packet headers so that it appears that the packets are coming from that host.

Malicious software (aka malware) can be also involuntarily downloaded to a computer and designed specifically to damage or disrupt a system by means of a virus or a Trojan horse. A "Trojan horse" is a program that masquerades as a benign application and unlike many viruses, they do not replicate themselves but can be just as destructive. One of the most insidious types of Trojan horse is a program that claims to rid your computer of viruses but instead introduces viruses onto a computer. The concepts relating to fraud detection and prevention can be applied also to other traditional methods of stealing personal information also include e-mail or other means that involve a fake premise or story such as seeking help fleeing from a third world country (e.g., Nigerian scam) or conducting some type of customer service call or transaction (e.g., "Hello, I am from your bank . . . ").

The fundamental problem of user authentication is exploited time and time again in order to commit fraudulent transaction online. Both financial institutions and merchants face a shared problem and ultimate challenge in properly authenticating who is really on the opposite end of a transaction. Information such as account user names and passwords are useless and rendered ineffective as reliable credentials in light of phishing and other Internet fraud scams. Authentication can be attempted by obtaining various types of information broadly ranging from any or all of the following: something you have; something you know; and/or something you are (biometrics). These include information obtained from tokens (hard, soft, dynamic), shared secret or things not commonly known such as a mother's maiden, a pet's name or a favorite color. An evolving system of security certificates (encryption with public key infrastructure (PKI), secure sockets layer (SSL)) may be relied upon also to verify and authenticate the validity of a party involved in an Internet transaction. Third party bureaus are also relied upon to provide information that can be used to authenticate an individual such as D&B reports, credit histories from Equifax and other agencies, and also Caller ID to identify the number associated with a person. At the same time, a user may attempt to authenticate a merchant, bank or other party at the other end of an online transaction also. Various tool bars may be employed to allow users to verify a website, an IP address or some other indication that a user is indeed in contact with a merchant, bank or other desired party in a transaction.

The information and actions by a party attempting to prevent or detect fraud is often met with an equally effective and opposite countermeasure by learned fraudsters. When banks or merchants create user names and passwords, they can be rendered ineffective by numerous scams and ways of obtaining user information such as phishing and key-loggers. "Key-loggers" are a type of surveillance software such as spyware that has the capability to record keystrokes to a log file (usually encrypted) made from instant messages, e-mail and any information (including e-mail addresses and website URLs visited) typed using a keyboard which can be later sent to a specified receiver. Key-loggers, as a surveillance tool, are often used by employers to ensure employees use work computers for business purposes only. Unfortunately, key-loggers can also be embedded in spyware allowing your information to be transmitted to an unknown third party.) Similarly, cookies that are often created to contain selected information used for identification can be simply deleted, and IP addresses that are associated with fraud can simply hide behind proxies.

Furthermore, when tokens are frequently used as a security measure to gain access to user information, the entire session or exchange can be merely cloned. The term "session cloning" may be defined as the ability of a third party to duplicate the session ID of a user and use it to interact with the web-based application at the same time as the original user. Session cloning is generally more of a threat when session IDs are predictable or obtainable, or if the site allows IP hopping. IP hopping is permitting the user to change their IP address mid-session without having to re-authenticate to the website. To minimize fraud and prevent IP hopping, one alternative is to track the domain of the source address (remembering domains can have more than two components) and require re-authentication if the domain changes. This does not prevent IP hopping within the same ISP but does limit the exposure. Another option to minimize risk is to consider using an inactivity timeout or terminating a session after a certain period of inactivity in order to protect people who leave their accounts signed-on and their systems unattended. Regardless of these preventative measures taken against session cloning, the risk of fraud remains which provides an opportunity for the invention herein to detect and prevent such activity when an attempt is made to use information from a computer.

It shall be understood that the description of fraudulent schemes provided herein is not exhaustive and that additional techniques will be developed in the future to improperly gain access to user information. Regardless of the means and methods used to obtain such information, the concepts of the invention can be applied to detect and prevent fraud by uniquely linking or fingerprinting such criminal activity with devices based upon selected delta of time parameters, clock differentials and time based parameters provided elsewhere herein. The sharing of information across one or more consortia may allow fraud detection systems to benefit from a larger pool of information, and thereby be more likely to detect and prevent fraud. These solutions can be implemented with no behavioral modification and have a zero imposition on a user as new ways are constantly developed to break past security barriers. The onus is not placed on the consumer to prevent attacks, nor is the consumer asked to change certain behavior to combat phishing or any other criminal behavior or scheme developed in the future.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system for providing real-time fraud alert detection across a plurality of online companies within a consortium using device fingerprints, the system comprising:
   a consortium device, database comprising a physical data store configured to store a plurality of device fingerprints, from at least two different online companies and to store corresponding indications of fraud risk;
   an authentication repository server system configured to electronically communicate with the consortium device database and comprising a processor configured with processor-executable instructions to perform operations comprising:
      transmitting a script to a first online company server associated with a first online company that allows push notification of data from a first connected user device and that has a first online connection with the first connected user device related to an in-process first online transaction;
      receiving first device identification data from the first online company server, the first device identification data including: a first non-personal device characteristic parameter that represents a first characteristic of the first connected user device, a first delta of time parameter calculated based on a difference in time between a first local time associated with a first computer clock of the first connected user device and a first, reference time of the first online company server, and a first device fingerprint for identifying the first connected user device based on at least the first delta of time parameter and the first non-personal device characteristic parameter;

storing the first non-personal device characteristic parameter, the first delta of time parameter, and the first device fingerprint in the consortium device database;

associating the first device fingerprint with the first delta of time parameter and the first non-personal device characteristic parameter;

receiving a first report that the first device fingerprint is connected to a first fraudulent transaction as to the first online transaction with the first online company server;

updating the consortium device database to indicate that the first device fingerprint with a fraud risk;

transmitting a script to a second online company server associated with a second online company that allows push notification of data from a second connected user device and that has a second online connection with the second connected user device related to an in-process second online transaction;

receiving second device identification data from the second online company server, the second device identification data including: a second non-personal device characteristic parameter that represents a second characteristic of the second connected user device, a second delta of time parameter calculated based on a difference in time between a second local time associated with a second computer clock of the second connected user device and a second reference time of the second online company server, and a second device fingerprint for identifying the second connected user device based on at least the second delta of time parameter and the second non-personal device characteristic parameter;

storing the second non-personal device characteristic parameter, the second delta of time parameter, and the second device fingerprint in the consortium device database;

associating the second device fingerprint with the second delta of time parameter and the second non-personal device characteristic parameter;

searching the consortium device database for data related to the second device fingerprint;

determining that the second device fingerprint is at least a near match to the first device fingerprint;

generating an electronic fraud alert package, for transmission to the second online company server, indicating that the second device fingerprint is associated with a high fraud risk level based on the first fraud report related to the first online company server; and transmitting the electronic fraud alert package to the second online company server, wherein the second online company server analyzes the electronic fraud alert package to execute instructions to terminate an in-process online transaction by the second connected user device.

2. The system of claim 1 wherein the first device identification data further includes personal identification information and the first device fingerprint is further based on the personal identification information.

3. The system of claim 1, wherein the first reference time and the second reference time are based on a same clock.

4. The system of claim 1, wherein the script is configured to operate in a tagless manner and does not require a program to be downloaded to the first connected user device or the second connected user device.

5. The system of claim 2, wherein the personal identification information includes one or more of the following: user name, address, billing information, shipping information, telephone number, or email address.

6. The system of claim 1, wherein the non-personal device characteristic parameter includes at least one of the following: IP address, or Browser ID.

7. The system of claim 1, wherein the first reference time is based on Coordinated Universal Time (UTC).

8. The system of claim 1, wherein the first delta of time parameter is expressed in increments of hours, minutes, seconds, or milliseconds.

9. The system of claim 1, wherein the high fraud risk level is further based on a second online company rule set comprising rules selected by the second online company indicating behavior patterns of user devices that indicate the high fraud risk, level.

10. A computer-implemented method for generating real-time fraud alerts in across online company servers within a consortium, the computer-implemented method comprising:

transmitting, by one or more computers of an authentication repository server system, a script to a first online company server associated with a first online company that allows push notification of data from a first connected user device and that has a first online connection with the first connected user device related to an in-process first online transaction;

receiving, by the one or more computers of the authentication repository server system, first device identification data from the first online company server, the first device identification data including: a first non-personal device characteristic parameter that represents a first characteristic of the first connected user device, a first delta of time parameter calculated based on a difference in time between a first local time associated with a first computer clock of the first connected user device and a first reference time of the first online company server, and a first device fingerprint for identifying the first connected user device based on at least the first delta of time parameter and the first non-personal device characteristic parameter;

storing, by the one or more computers of the authentication repository server system, the first non-personal device characteristic parameter, the first delta of time parameter, and the first device fingerprint in a consortium device database comprising a physical data store configured to store a plurality of device fingerprints from at least two different online companies and to store corresponding indications of fraud risk;

associating, by the one or more computers of the authentication repository server system, the first device fingerprint with the first delta of time parameter and the first non-personal device characteristic parameter;

receiving, by the one or more computers of the authentication repository server system, a first report that the first device fingerprint is connected to a first fraudulent transaction as to the first online transaction with the first online company server;

updating, by the one or more computers of the authentication repository server system, the consortium device database to indicate that the first device fingerprint is associated with a fraud risk;

transmitting, by the one or more computers of the authentication repository server system, a script to a second online company server associated with a second online company that allows push notification of data from a second connected user device and that has a second online connection with the second connected user device related to an in-process second online transaction;

receiving, by the one or more computers of the authentication repository server system, second device identification data from the second online company server, the second device identification data including: a second non-personal device characteristic parameter that represents a second characteristic of the second connected user device, a second delta of time parameter calculated based on a difference in time between a second local time associated with a second computer clock of the second connected user device and a second reference time of the second online company server, and a second device fingerprint for identifying the second connected user device based on at least the second delta of time parameter and the second non-personal device characteristic parameter;

storing, by the one or more computers of the authentication repository server system, the second non-personal device characteristic parameter, the second delta of time parameter, and the second device fingerprint in the consortium device database;

associating, by the one or more computers of the authentication repository server system, the second device fingerprint with the second delta of time parameter and the second non-personal device characteristic parameter;

searching, by the one or more computers of the authentication repository server system, the consortium device database for data related to the second device fingerprint;

determining, by the one or more computers of the authentication repository server system, that the second device fingerprint is at least a near match to the first device fingerprint;

generating, by the one or more computers of the authentication repository server system, an electronic fraud alert package, for transmission to the second online company server, indicating that the second device fingerprint is associated with a high fraud risk level based on the first fraud report related to the first online company server; and transmitting, by the one or more computers of the authentication repository server system, the electronic fraud alert package to the second online company server, wherein the second online company server analyzes the electronic fraud alert package to execute instructions to terminate an in-process online transaction by the second connected user device.

11. The computer-implemented method of claim 10, wherein the first device identification data further includes personal identification information and the first device fingerprint is further based on the personal identification information.

12. The computer-implemented method of claim 10, the first reference time and the second reference time are based on a same clock.

13. The computer-implemented method of claim 12, wherein the script is configured to operate in a tagless manner and does not require a program to be downloaded to the first connected user device or the second connected user device.

14. The computer-implemented method of claim 12, wherein the personal identification information includes one or more of the following: user name, address, billing information, shipping information, telephone number, or email address.

15. The computer-implemented method of claim 10, wherein the non-personal device characteristic parameter includes at least one of the following: IP address, or Browser ID.

16. The computer-implemented method of claim 10, wherein the first reference time is based on Coordinated Universal Time (UTC).

17. The computer-implemented method of claim 10, wherein the first delta of time parameter is expressed in increments of hours, minutes, seconds, or milliseconds.

18. The computer-implemented method of claim 10, wherein the high fraud risk level is further based on a second online company rule set comprising rules selected by the second online company indicating behavior patterns of user devices that indicate the high fraud risk level.

19. A non-transitory computer-readable storage medium having stored thereon computer-executable instructions that, when executed by a computing system, instructs the computer system to perform operations comprising:

transmitting a script to a first online company server associated with a first online company that allows push notification of data from a first connected user device and that has a first online connection with the first connected user device related to an in-process first online transaction;

receiving first device identification data from the first online company server, the first device identification data including: a first non-personal device characteristic parameter that represents a first characteristic of the first connected user device, a first delta of time parameter calculated based on a difference in time between a first local time associated with a first computer clock of the first connected user device and a first reference time of the first online company server, and a first device fingerprint for identifying the first connected user device based on at least the first delta of time parameter and the first non-personal device characteristic parameter;

storing the first non-personal device characteristic parameter, the first delta of time parameter, and the first device fingerprint in a consortium device database comprising a physical data store configured to store a plurality of device fingerprints from at least two different online companies and to store corresponding indications of fraud risk;

associating the first device fingerprint with the first delta of time parameter and the first non-personal device characteristic parameter;

receiving a first report that the first device fingerprint is connected to a first fraudulent transaction as to the first online transaction with the first online company server;

updating the consortium device database to indicate that the first device fingerprint is associated with a fraud risk;

transmitting a script to a second online company server associated with a second online company that allows push notification of data from a second connected user device and that has a second online connection with the second connected user device related to an in-process second online transaction;

receiving second device identification data from the second online company server, the second device identification data including: a second non-personal device characteristic parameter that represents a second characteristic of the second connected user device, a second delta of time parameter calculated based on a difference in time between a second local time associated with a second computer clock of the second connected user device and a second reference time of the second online company server, and a second device fingerprint for identifying the second connected user device based on at least the second delta of time parameter and the second non-personal device characteristic parameter;

storing the second non-personal device characteristic parameter, the second delta of time parameter, and the second device fingerprint in the consortium device database;

associating the second device fingerprint with the second delta of time parameter and the second non-personal device characteristic parameter;

searching the consortium device database for data related to the second device fingerprint;

determining that the second device fingerprint is at least a near match to the first device fingerprint;

generating an electronic fraud alert package, for transmission to the second online company server, indicating that the second device fingerprint is associated with a high fraud risk level based on the first fraud report related to the first online company server; and transmitting the electronic fraud alert package to the second online company server, wherein the second online company server analyzes the electronic fraud alert package to execute instructions to terminate an in-process online transaction by the second connected user device.

20. The non-transitory computer storage of claim 19, wherein the high fraud risk level is further based on a second online company rule set comprising rules selected by the second online company indicating behavior patterns of user devices that indicate the high fraud risk level.

* * * * *